United States Patent
Chen et al.

(10) Patent No.: US 12,368,194 B2
(45) Date of Patent: *Jul. 22, 2025

(54) RECYCLING AND REGENERATION OF LITHIUM-ION BATTERY CATHODES

(71) Applicant: THE REGENTS OF THE UNIVERSITY OF CALIFORNIA, Oakland, CA (US)

(72) Inventors: Zheng Chen, San Diego, CA (US); Panpan Xu, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/030,950

(22) PCT Filed: Oct. 8, 2021

(86) PCT No.: PCT/US2021/054295
§ 371 (c)(1),
(2) Date: Apr. 7, 2023

(87) PCT Pub. No.: WO2022/076904
PCT Pub. Date: Apr. 14, 2022

(65) Prior Publication Data
US 2023/0420760 A1    Dec. 28, 2023

Related U.S. Application Data

(60) Provisional application No. 63/090,136, filed on Oct. 9, 2020.

(51) Int. Cl.
*H01M 10/54* (2006.01)
*C22B 7/00* (2006.01)
(Continued)

(52) U.S. Cl.
CPC .......... *H01M 10/54* (2013.01); *C22B 7/006* (2013.01); *C22B 26/12* (2013.01);
(Continued)

(58) Field of Classification Search
CPC .... H01M 10/54; H01M 4/0471; H01M 4/049; H01M 4/5825; H01M 2004/028; C22B 7/006; C22B 26/12
See application file for complete search history.

(56) References Cited

U.S. PATENT DOCUMENTS 9,484,606 B1   11/2016   Sloop et al.
2016/0218365 A1   7/2016   Yamamoto
(Continued)

FOREIGN PATENT DOCUMENTS

CN   106997975 A   *   8/2017   ............. C22B 26/12
CN   110240207 A   *   9/2019   ............. C01G 53/50
(Continued)

OTHER PUBLICATIONS

English Machine Translation of Dong et al. (CN-110240207-A) (Year: 2019).*
(Continued)

*Primary Examiner* — Miriam Stagg
*Assistant Examiner* — Emily Elizabeth Freeman
(74) *Attorney, Agent, or Firm* — Eleanor Musick; Torrey Pines Law Group PC

(57) ABSTRACT

A method for regeneration of spent cathode material of lithium-ion batteries involves lithiating the cathode material in a relithiation solution including a reducing agent at a temperature in the range of 60° C. to 180° C. for a sufficient time to heal composition defects in the cathode material. The lithiated material is then sintered to completely recover the properties. The relithiation solution may be a Li-ion source (Continued)

combined with nature-based organic reducing agent such as citric acid, ascorbic acid, tartaric acid, or similar.

20 Claims, 17 Drawing Sheets

(51) Int. Cl.
   *C22B 26/12* (2006.01)
   *H01M 4/02* (2006.01)
   *H01M 4/04* (2006.01)
   *H01M 4/58* (2010.01)

(52) U.S. Cl.
   CPC ......... *H01M 4/0471* (2013.01); *H01M 4/049* (2013.01); *H01M 4/5825* (2013.01); *H01M 2004/028* (2013.01)

(56) References Cited

U.S. PATENT DOCUMENTS

| | | | |
|---|---|---|---|
| 2018/0309174 A1 | 10/2018 | Rodriguez et al. | |
| 2021/0111445 A1 | 4/2021 | Chen et al. | |
| 2021/0384525 A1 | 12/2021 | Kim | |
| 2022/0199966 A1 | 6/2022 | Chen et al. | |
| 2023/0327071 A1* | 10/2023 | Li | C01G 53/50 429/231.95 |

FOREIGN PATENT DOCUMENTS

| | | |
|---|---|---|
| WO | 2019136397 A1 | 7/2019 |
| WO | 2020023912 A1 | 1/2020 |

OTHER PUBLICATIONS

PCT/US2021/054295 International Search Report and Written Opinion of the International Search Authority, Dec. 28, 2021 (8 pages).

Aaltonen, M., et al., Leaching of Metals from Spent Lithium-Ion Batteries, MDIP Recycling, 2017, pp. 1-9.

Younesi, R., et al., Lithium salts for advanced lithium batteries: Li-metal, Li—O2, and Li—S, Energy & Environmental Science, The Royal Society of Chemistry, 2015, pp. 1905-2922.

* cited by examiner

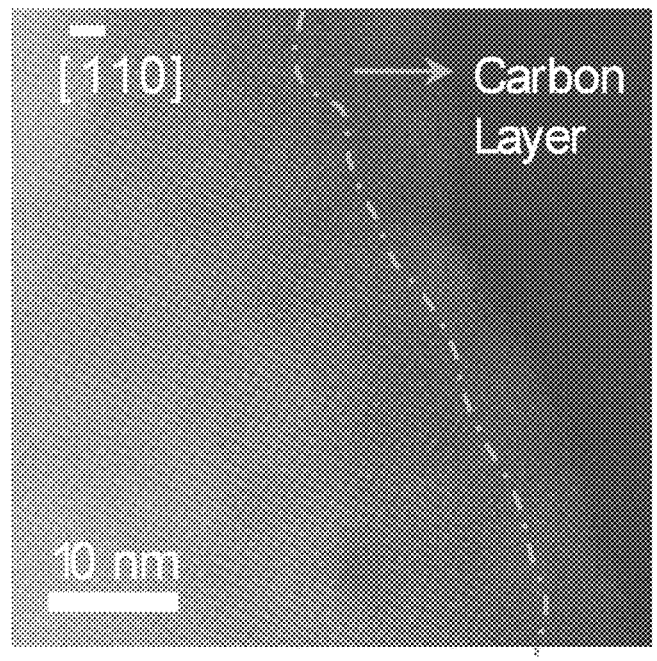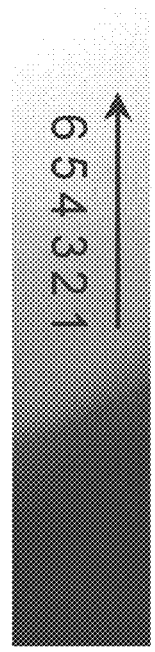
FIG. 2A  FIG. 2B
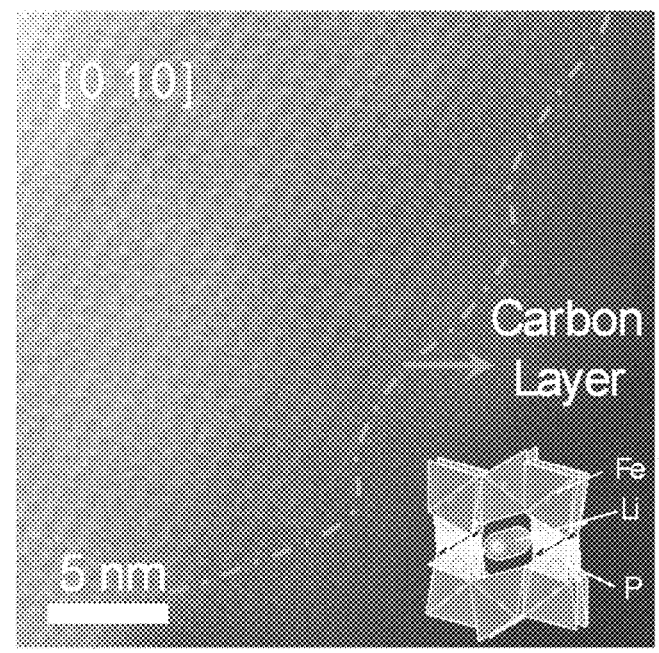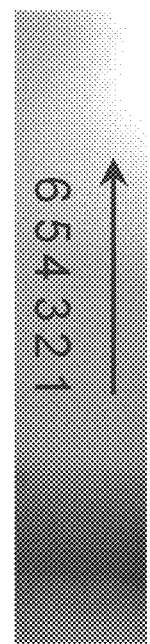
FIG. 2E  FIG. 2F

RECYCLING AND REGENERATION OF LITHIUM-ION BATTERY CATHODES

RELATED APPLICATIONS

This application is a 371 national stage filing of International Application No. PCT/US2021/054295, filed Oct. 8, 2021, which claims the benefit of the priority of U.S. Application No. 63/090,136, filed Oct. 9, 2020, each of which is incorporated herein by reference in its entirety.

GOVERNMENT RIGHTS

This invention was made with government support under Grant No. CBET-1805570 awarded by the National Science Foundation. The government has certain rights in the invention.

FIELD OF THE INVENTION

The present invention relates to a method for direct regeneration of spent lithium-ion batteries.

BACKGROUND

Olivine lithium iron phosphate ($LiFePO_4$ or LFP) is one of the most widely used cathode materials for lithium-ion batteries (LIBs) owing to its high thermal stability, long cycle life and low-cost. These advantages have led to the LFP battery share becoming more than one-third of the entire LIB market, currently dominating applications in power tools, electric bus, and grid energy storage. The global demand of LIBs is projected to reach 440 GWh by 2025. This means that millions of tons of spent LIBs will soon to be generated at the ends of their service lives (3 to 10 years). Effective recycling and re-manufacturing of spent LIBs can help to reclaim valuable materials, reduce energy use for mining natural resources, and mitigate environmental pollution from end-of-life management of waste batteries, making LIBs more affordable and sustainable.

Current efforts on LIB recycling have been focused on recovery of valuable metals. For example, pyrometallurgical and hydrometallurgical processes have been used commercially to recycle LIBs containing cobalt (Co) and nickel (Ni). These processes generally involve battery dismantling, smelting and/or acid leaching followed by multi-step chemical precipitation and separation, in the end breaking LIB cells down into simple compounds (e.g., $CoSO_4$, $NiSO_4$, $Li_2CO_3$) that can be used to re-synthesize new cathode materials. Due to the high value of transition metals (e.g., —$30/kg for Co), reasonable economic return can be achieved from such recycling processes, notwithstanding their high operation cost. Unfortunately, their high energy demand and reliance on caustic chemicals (acids, oxidation reagents) produce significant greenhouse gas (GHG) emissions and secondary wastes, raising additional environmental concerns, a frequent criticism heard from individuals who are resisting the migration to electrical energy sources. Moreover, a large portion of the cathode's value, represented by their tailored composition and structure, is completely lost through these destructive recycling processes. Therefore, more efficient approaches with significantly reduced energy cost and waste generation are needed, especially for LIBs made without expensive metals, such as LFP, as the economic value of their recycled elemental products is insufficient to compensate for the high cost of pyrometallurgical and hydrometallurgical processes. This is particularly true when considering that world battery makers have been producing about 100,000 tons/year in total of LFP cathodes since 2015. The large quantity of these batteries that will soon be retired increases the urgency for better recycling solutions.

Decades of studies have revealed that the performance degradation of LFP cathode is mainly attributable to Li vacancy defects ($Li_v$) and Fe occupation of Li site ($Fe_{Li}$). The $Li_v$ defects not only result in oxidation of Fe to Fe 3+, but also induce partial migration of $Fe^{2+}$ to the lithium site, forming so-called "anti-site" defects, which block the $Li^+$ diffusion pathway. While the charge storage capacity may be significantly reduced, the morphology and bulk crystal structure of spent LFP particles often remain unchanged. This failure mechanism provides a potential opportunity to directly revitalize degraded LFP to form new LFP particles that can be readily used for making new battery cells.

Recycling of spent lithium-ion batteries (LIBs) is an urgent need to address their environmental and global sustainability issues. The inventive method is directed to a solution.

BRIEF SUMMARY

The present invention relates to a method for direct regeneration of spent $LiFePO_4$ cathode material of lithium-ion batteries via solution lithiation under low temperature followed by short sintering. This relatively low energy, mild chemical process enables profitable processing even for recycling $LiFePO_4$ without high-value elements (Ni or Co). The emission of greenhouse gas is demonstrated to be very low. The economical and eco-friendly recycling method shows great potential for application in industry.

The inventive method is an efficient and environmentally-benign LIB regeneration method based on defect-targeted healing, which represents a paradigm-shift in LIB recycling strategy. Specifically, by combining low-temperature aqueous solution relithiation and rapid post-sintering, we demonstrate successful direct regeneration of spent $LiFePO_4$ (LFP) cathodes, one of the most important materials for EVs and grid storage applications. The composition, structure, and electrochemical performance of LFP cathodes can be revitalized to the same levels as the pristine LFP, even at a wide range of degradation. Life-cycle analysis shows that this defect-targeted direct recycling approach can significantly reduce energy usage and greenhouse gas (GHG) emissions, leading to more economic and environmental benefits compared with today's hydrometallurgical and pyrometallurgic methods.

In one aspect of the invention, a method for regeneration of spent cathode material of lithium-ion batteries includes: lithiating the cathode material in a relithiation solution comprising at least one reducing agent at a temperature in the range of 60° C. to 180° C. for a sufficient time to heal composition defects in the cathode material; and sintering the lithiated material. The relithiation solution may comprise a lithium salt and the at least one reducing agent, wherein the at least one reducing agent may be one or a combination of nature-derived organic reducing agents. The nature-derived organic reducing agents may be selected from the group consisting of citric acid, ascorbic acid, tartaric acid, oxalic acid, sugars, or a combination thereof. In some embodiments, the relithiation solution may be a mixture of 0.01-4M LiOH solution and 0.01-2M citric acid. In some embodiments, the lithium salt is selected from the group consisting of LiOH, $Li_2SO_4$, LiCl, $LiC_2H_3O$, and $LiNO_3$. The cathode material may be $LiFePO_4$. Prior to the relithiating step, the cathode material may be obtained by disassembling the lithium-ion battery and removing cathode strips; disposing the cathode strips in a solvent to separate lithium-containing powder from other components within the cathode strips; and washing and drying the separated lithium-containing powder. In some embodiments, the sufficient time is within a range of 1 hour to 18 hours. The temperature may be within a range of 60-120° C. and the sufficient time may be at least 5 hours. The step of sintering may be performed in a furnace under an inert atmosphere at a sintering temperature in the range of 400° C. to 800° C. for a sintering time in a range of 50 to 300 minutes. The sintering time may include temperature ramping to gradually heat the lithiated material at a controlled rate. The relithiation solution is recyclable and reusable for subsequent relithiation processes.

In another aspect of the invention, a method for regeneration of $LiFePO_4$ cathode material from a spent lithium-ion battery includes: disassembling the lithium-ion battery and removing cathode strips; soaking the cathode strips in a solvent to separate lithium-containing powder from other components within the cathode strips; washing and drying the separated lithium-containing powder; disposing the lithium-containing powder in a vessel with a relithiation solution comprising a reducing agent; heating the vessel and solution to a temperature in the range of 60° C. to 180° C. for a sufficient time to heal composition defects in the cathode material; and sintering the lithiated material in an inert atmosphere at a sintering temperature. The relithiation solution may comprise a lithium salt and the at least one reducing agent, wherein the at least one reducing agent may be one or a combination of nature-derived organic reducing agents. The nature-derived organic reducing agents may be selected from the group consisting of citric acid, ascorbic acid, tartaric acid, oxalic acid, sugars, or a combination thereof. In some embodiments, the relithiation solution may be a mixture of 0.01-4M LiOH solution and 0.01-2M citric acid. In some embodiments, the lithium salt is selected from the group consisting of LiOH, $Li_2SO_4$, LiCl, $LiC_2H_3O$, and $LiNO_3$.

The sufficient time may be within a range of 1 hour to 18 hours. In some embodiments, the temperature may be within a range of 60-120° C. and the sufficient time is at least 5 hours. The sintering temperature may be in the range of 400° C. to 800° C., where sintering is performed for a sintering time in a range of 50 to 300 minutes. The sintering time may include temperature ramping to gradually heat the lithiated material at a controlled rate. The relithiation solution is recyclable and reusable for subsequent relithiation processes.

The inventive method employs a green and efficient LIB direct recycling strategy based on defect-targeted healing to precisely resolve the $Li_v$ and anti-site defects without altering any other properties of LFP particles. We successfully demonstrate direct regeneration of spent LFP cathodes with various degradation conditions to recover their composition, structure, and electrochemical performance to the same level as pristine LFP cathode. Unlike pyrometallurgical and hydrometallurgical recycling, such defect-targeted direct recycling process only needs a low concentration of lithium salt, green and low-cost reducing agent, nitrogen, and water. With proper modification, this method can also be extended to recycle other "low-cost" LIB cathodes such as $LiMn_2O_4$ (LMO) batteries. Life-cycle analysis of direct recycling of LFP shows that our approach can significantly reduce the energy usage (by ~80-90%) and GHG emissions (by ~75%), leading to more economic and environmental benefits than the current state-of-the-art approaches.

BRIEF DESCRIPTION OF THE DRAWINGS

FIG. 1A is a schematic illustration of the solution relithiation process; FIG. 1B plots the evolution of LFP composition during relithiation at different temperatures; FIG. 1C plots the saturation vapor pressure of water under various temperatures associated with an equipment (schematic) of choice for high pressure (>1 bar) and low pressure (<1 bar); FIG. 1D provides XRD patterns of C-LFP and R-LFP with different relithiation times; and FIG. 1E shows the dependence of Li+ apparent diffusion coefficient and required diffusion time on temperature.

FIGS. 2A-2I illustrate microstructure characterization of different LFP particles according to an embodiment of the inventive method, where FIGS. 2A and 2E are STEM images of C-LFP and R-LFP, respectively. FIGS. 2B and 2F are STEM images of a C-LFP and a R-LFP particle, respectively; FIGS. 2C and 2G are Fe L-edge EELS spectra of a C-LFP particle and a R-LFP particle, respectively; FIGS. 2D and 2H show Rietveld refinement patterns of the neutron diffraction data of C-LFP and R-LFP, respectively.

FIG. 3A is a time-dependent contour plot of diffraction peak intensity in the heating, holding and cooling stages; FIG. 3B shows anti-site defects revolution upon heating, holding, and cooling; FIG. 3C plots the cycling stability of C-LFP, R-LFP, RS-LFP and P-LFP; FIG. 3D compares rate performance of C-LFP, R-LFP, RS-LFP and P-LFP; and FIG. 3E plots long-term cycling stability of RS-LFP cycled at 2 C, 5 C and 10 C for 300 cycles.

FIG. 5B plots the cycling stability at a rate of 0.5C; FIG. 5C shows the discharge capacity of the full-cell at the first cycle of 0.1C; and FIG. 5D plots the cycling stability at a rate of 0.5C.

FIGS. 6B and 6C show total energy consumption and GHG emissions per kg of recycled cell from pyrometallurgical, hydrometallurgical and direct recycling, respectively; and FIGS. 6D and 6E compare total energy consumption and GHG emissions per kg of cathode production from virgin materials and spent batteries using direct recycling process.

DETAILED DESCRIPTION OF EMBODIMENTS OF THE INVENTION

Figure 1A:
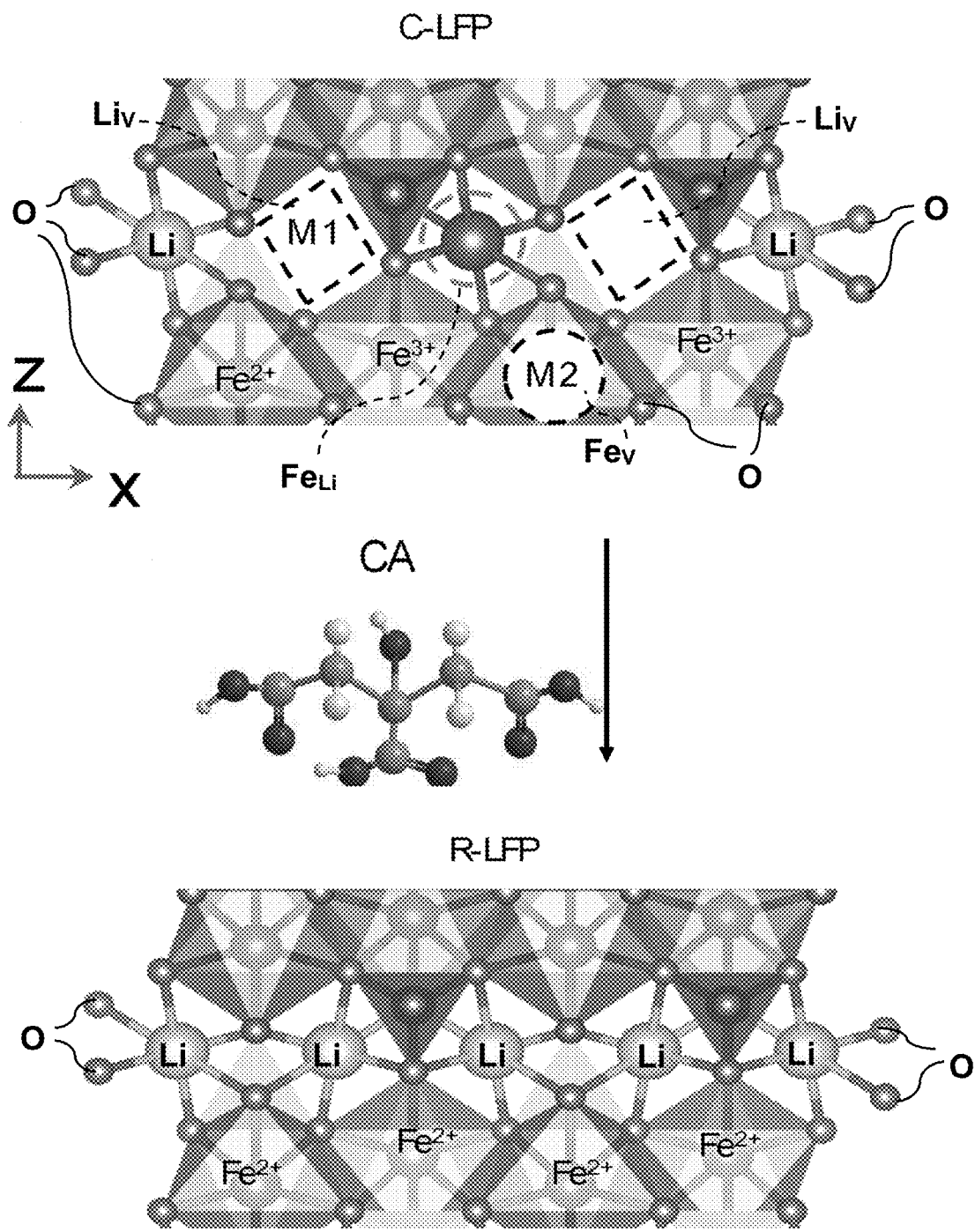
FIGS. 1A-1E illustrate relithiation kinetics of C-LFP according to the inventive method, where

To demonstrate the inventive defect-targeted direct recycling method, commercial LFP cells were cycled for up to 6500 cycles in the 2.5-3.8 V voltage range to reach a capacity decay of up to 50%. The cells were disassembled and LFP powders were harvested from the cathodes following the procedures described by Y. Shi, et al., ((2018), "Effective regeneration of LiCoO2 from spent lithium-ion batteries: A direct approach towards high-performance active particles. *Green Chem.* 20, 851-862.) The collected cycled LFP particles (denoted as "C-LFP") were subject to relithiation treatment in a Li-containing aqueous solution with controlled temperature and time. The relithiated LFP powders (R-LFP) were washed thoroughly using deionized (DI) water, dried, and then subjected to post sintering to complete the entire regeneration process.

LiFePO$_4$, "LFP", cells were cycled in the voltage range of 2.5-3.8 V using an Arbin battery tester for over 6500 cycles and then discharged to 2 V at C/10 (1C=170 mA g$^{-1}$) before disassembly. The cathode strips were thoroughly rinsed with dimethyl carbonate (DMC) to remove residual electrolyte. After drying, the cathode strips were soaked in NMP (N-Methylpyrrolidone) or other appropriate solvent for 30 min followed by sonication for 20 min, which removed the LFP powders, binder, and carbon black from the aluminum substrates. The obtained suspension was centrifuged at 3500 rpm for 5 min and the cycled LFP (C-LFP) powders were precipitated, separated, and dried for regeneration.

Fresh cells were directly discharged to 2 V at C/10 without any cycling before disassembly, and the harvested LFP material served as the reference material for comparison.

The C-LFP was regenerated through a solution relithiation followed by a short annealing process. For the solution relithiation treatment, LFP powders harvested from cycled cells were loaded into a 100 mL reactor filled with 80 mL of 0.2 M LiOH and 0.08 M CA solution. An exemplary range for the solution composition will be 0.01-4M Li solution and 0.01-2M reducing agent. The reactor was kept at a wide range of temperatures for various operation times for relithiation. The relithiated LFP (R-LFP) powders were washed thoroughly with deionized water, and dried. The R-LFP was then mixed with excess 4% Li$_2$CO$_3$ and subject to thermal sintering at different temperatures for 2 h in an inert (nitrogen) atmosphere with a temperature ramping rate of 5° C. min$^{-1}$. The final recycled LFP is denoted as RS-LFP. It should be noted that while the experiments described herein use LiOH as the source of lithium ions, as will be apparent to those of skill in the art, other lithium ion sources, including lithium salts such as Li$_2$SO$_4$, LiCl, LiC$_2$H$_3$O$_2$, LiNO$_3$, among others, may be used.

The crystal structure of the powders was examined by X-ray powder diffraction (XRD) employing Cu Kα radiation. The X-ray photoelectron spectroscopy (XPS) measurement was performed with Kratos AXIS Ultra DLD with Al Kα radiation. The composition of pristine, degraded, and regenerated LFP cathode was measured by an inductively coupled plasma mass spectrometry (ICP-MS). HRTEM was recorded on JEOL-2800 at 200 kV with Gatan OneView Camera. STEM-EDS was performed on primary particles a at annular dark field (ADF) mode using the same instrument. STEM-EELS was performed on JEOL JEM-ARM300CF at 300 kV, equipped with double correctors. Ex-situ neutron diffraction patterns were collected in the high-resolution mode (Δd/d ~0.25%) for a duration of 2 h under the nominal 1.1 MW SNS operation, and then processed using VDRIVE software, a suite of neutron diffraction data reduction and analysis software available from Oak Ridge National Laboratory. Operando neutron diffraction data were collected in the high intensity mode (Δd/d ~0.45%) while the powders were heated and cooled in a furnace under nitrogen atmosphere.

To evaluate electrochemical performance using electrodes with moderate mass loading, different LFP powder sample was mixed with polyvinylidene fluoride (PVDF) and Super P65 in NMP at a mass ratio of 8:1:1. The resulted slurries were cast on aluminum foils followed by vacuum drying at 120° C. for 6 h. Circle-shape electrodes were cut and compressed, with controlled active mass loading of about 3-5 mg cm'. To make electrodes for high-mass loading half-cells and pouch full-cells testing, the cathode casting was made with a commercial relevant ratio (RS-LFP:Super P:PVDF=95:2:3) and the mass loading of active material was controlled at ~19 mg/cm 2. Galvanostatic charge-discharge was carried out in the potential range of 2.5-3.8 V with the assembled cells. The electrolyte was LP40 (1M LiPF$_6$ in ethylene carbonate/diethyl carbonate=50:50 (v/v)). The cells were cycled with activation for 3 cycles at 0.1C followed by extended cycling at higher rates. The electrochemical impedance spectroscopy (EIS) tests were performed at discharged state in the frequency range of 10$^6$ Hz to 10$^{-3}$ Hz with signal amplitude of 10 mV by a Metrohm Autolab potentiostat.

The key to regenerate C-LPF is to precisely resolve the Li$_v$ and anti-site defects. A high activation energy (1.4 eV) is required for Fe ions to migrate back to the original position (M2) because of the strong electrostatic repulsion of high valence state of Fe$^{3+}$ during migration. Referring to FIG. 1A, the positions of Li and Fe in a perfect olivine structure are defined as M1 and M2 sites, respectively. The upper panel of the figure shows C-LFP with Li vacancies (Li$_v$) and Fe occupation in Li site (Fe$_{Li}$), while the lower panel shows R-LFP with all the Fe$^{3+}$ being reduced to Fe$^{2+}$ through processing via CA (citric acid, center panel) in a LiOH solution. Park et al. ("Anti-site reordering in LiFePO$_4$: Defect annihilation on charge carrier injection", *Chem. Mater.* 26, 5345-5351 (2014)), demonstrated successful anti-site re-ordering via deep discharging to 1.5V (vs. Li/Li') at an extremely low rate of C/100 ("1C" represents charge or discharge in one hour). The theoretical study also reveals that a reductive environment can lower the activation barrier which in turn can facilitate Fe migration. Therefore, for effective direct regeneration of C-LFP, the most critical step is to reduce Fe$^{3+}$ and re-dose lithium ions (Lit) into C-LFP.

The half electrode potential of LFP electrode is 0.40 V (vs. standard hydrogen electrode or SHE) (Equation 1).

$$\text{FePO}_4 + \text{Li}^+ + e^- \rightarrow \text{LiFePO}_4 \quad E(\text{FePO}_4/\text{LiFePO}_4) = 0.40 \text{ V} \quad (1)$$

$$\tfrac{1}{2}C_6H_8O_7 - e^- \rightarrow \tfrac{1}{2}C_5H_6O_5 + \tfrac{1}{2}CO_2 + H^+ \quad E(C_5H_6O_5/C_6H_8O_7) = -0.34 \text{ V} \quad (2)$$

$$\text{FePO}_4 + \text{Li}^+ + \tfrac{1}{2}C_6H_8O_7 \rightarrow \text{LiFePO}_4 + \tfrac{1}{2}C_5H_6O_5 + \tfrac{1}{2}CO_2 + H^+ \quad E(\text{FePO}_4/C_6H_8O_7) = -0.74 \text{ V} \quad (3)$$

A variety of reducing agents may be used to proceed reduction of Fe$^{3+}$. Inorganic reductants such as NaBH$_4$, Na$_2$S$_2$O$_3$, and hydrogen peroxide (H$_2$O$_2$) are well known for their effectiveness as reducing agents in various combinations. Nature-derived organic reductants are particularly interesting for the inventive process as they are safe and environmentally benign. Examples of appropriate reductants include citric acid ($C_6H_8O_7$), oxalic acid ($C_2H_2O_4$), ascorbic acid ($C_6H_8O_6$), tartaric acid ($C_4H_6O_6$), which may be used alone or in combinations. Glucose ($C_6H_{12}O_6$) and other sugars are also possible nature-derived organic reductants that may be employed. For example, citric acid (CA), concentrated in citrus fruits, has a redox potential of ~−0.34 V (vs. SHE) (Equation 2), which can be an ideal candidate to assist the reduction of C-LFP. The Gibbs free energy for equation (3), the complete reaction by combining (1) and (2), is calculated to be −56.35 kJ/mol (see details in Supporting Information), indicates that the relithiation reaction of degraded LFP is thermodynamically favorable. In our experiment design, CA in the Li-containing aqueous solution donates electrons to reduce $Fe^{3+}$, reducing electrostatic repulsion and subsequently lowering the migration barrier to move $Fe^{2+}$ from the M1 site back to the M2 site, which facilitates the solution $Li^+$ diffusion into the Li-deficient C-LFP particles.

Figure 1B:
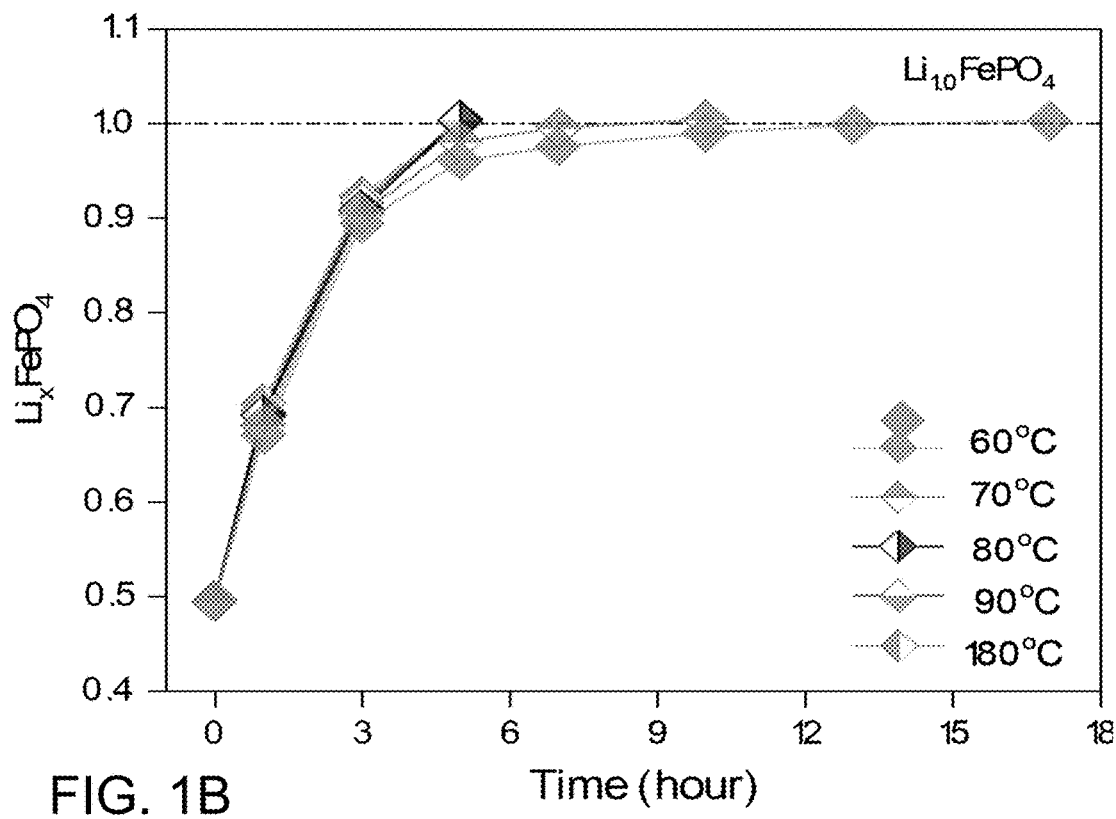
Figure 1C:
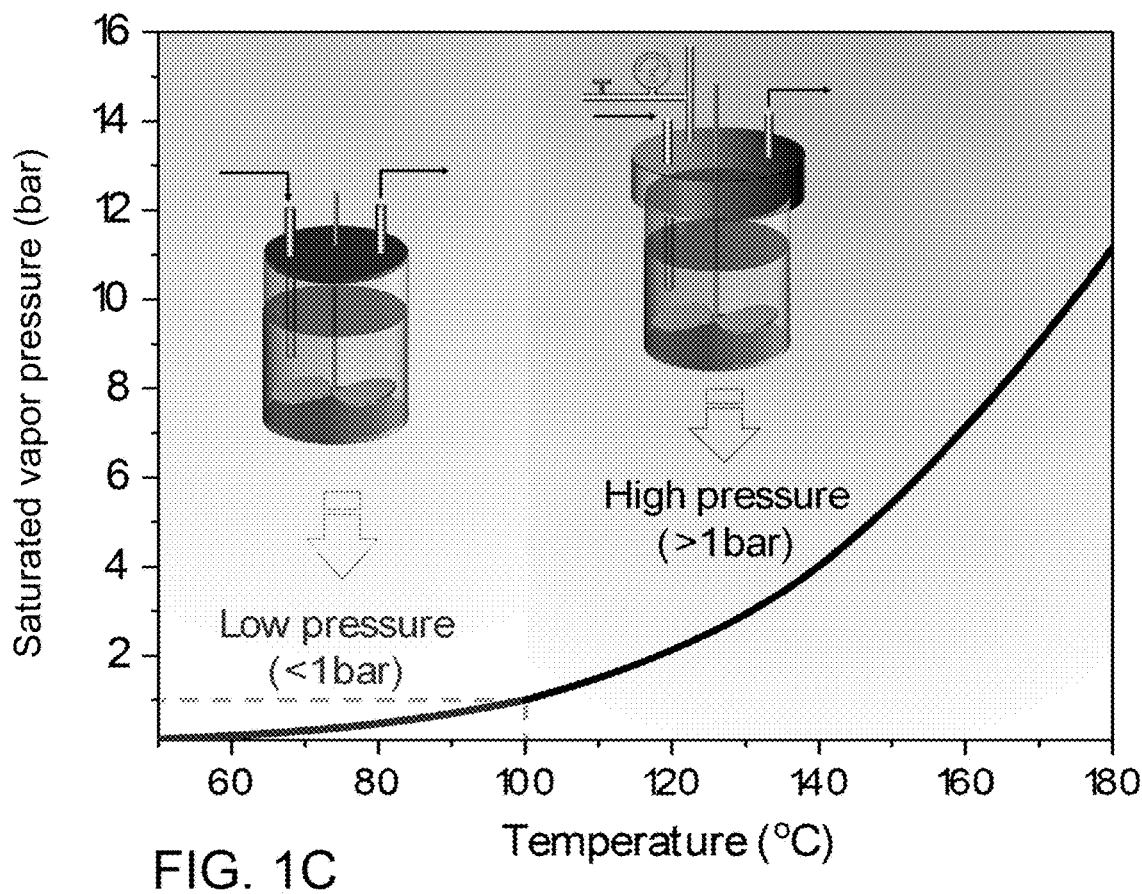
Figure 1D:
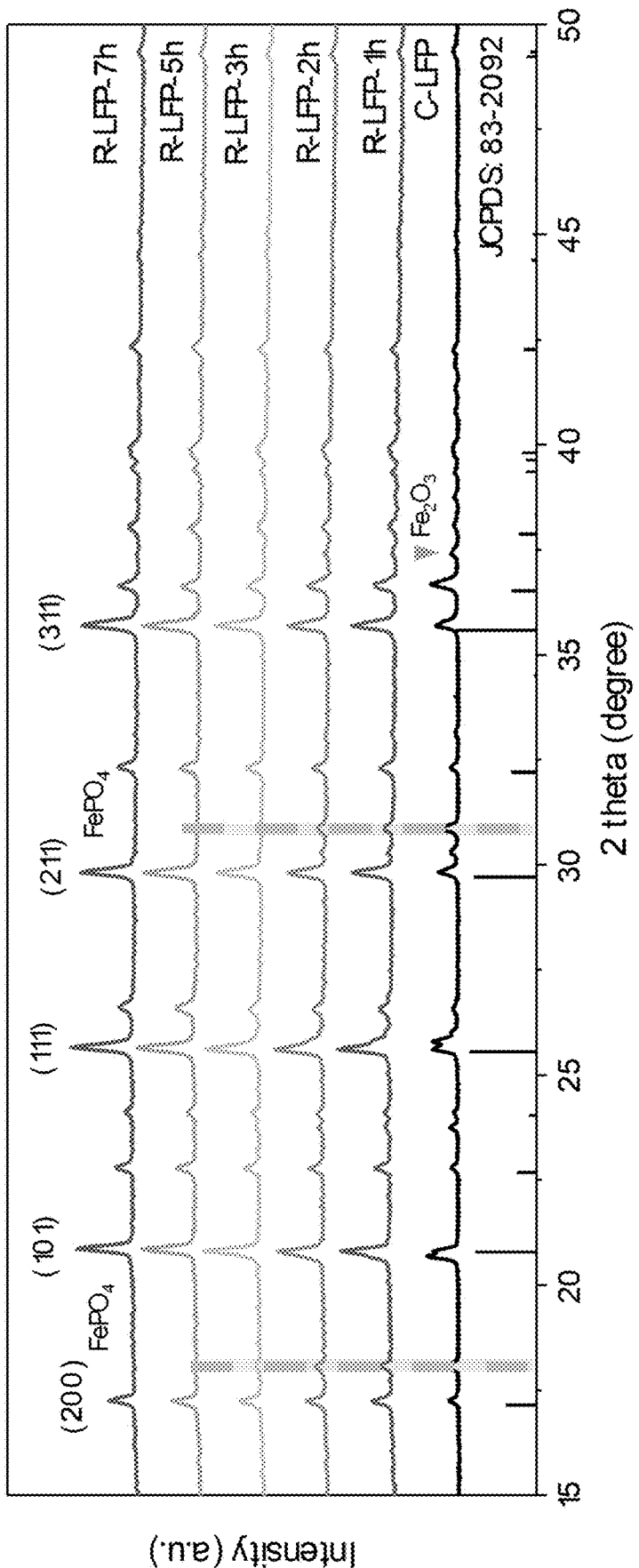

The evolution of LFP composition during the solution relithiation was monitored by inductively coupled plasma mass spectrometry (ICP-MS). We first tested relithiation at 180° C., which is the minimum temperature required for relithiation of degraded layered oxides such as $LiCoO_2$ and $LiNi_{1-x-y}Co_xMn_yO_2$ cathodes. As shown in FIG. 1B, the Li composition of the C-LFP particles increased from 0.5 to 1.0 as the relithiation time was extended to 5 hr. Note that an autoclave reactor that can hold pressure greater than 11 bar (saturation pressure of water) is preferably used for this operation (FIG. 1C). Effective relithiation at sub-boiling temperature allows pressurized reactors to be replaced by low-cost vessels without extra safety precautions. Composition analysis of the relithiation solution before and after reaction showed that 1.9 mol % of Fe was leached from the initial LFP. This may be attributed to the trace amount of $Fe_2O_3$ generated in the degraded LFP after long-term cycling (FIG. 1D). From the quality control perspective, leaching the residual $Fe_2O_3$ phase might be desirable as it provides high purity LFP phase in the regenerated product. The gradual diminishment of $FePO_4$ peaks (marked by the dashed gray vertical lines) indicates the conversion of the $FePO_4$ phase to LFP phase.

With the goal of minimizing the energy consumption for the process, lower temperatures were explored. Surprisingly, as shown in FIG. 1B, reducing the solution temperature to as low as 80° C. resulted in a negligible change in the relithiation kinetics. Further extending the treatment time allowed continuous reduction of the solution temperature for relithiation. For example, 100% composition recovery can be achieved at a temperature of 70° C. and 60° C. after 10 and 17 hours of relithiation, respectively.

The $Li^+$ apparent diffusion coefficient and time at different temperatures were calculated. The details of the calculation are shown as the following:

$$D_{Li^+}^{app} = \frac{R^2 T^2}{2A^2 n^4 F^4 C^2 \sigma^2}$$

where R is the gas constant, T the absolute temperature, A the interface between the cathode and electrolyte (A=1.6 $cm^2$), n the number of electrons involved in the reaction, F the Faraday constant, C the concentration of $Li^+$ in the electrode (=ρ/M) based on the molecular weight of LFP (M) and density (ρ), and a the Warburg factor. The Warburg factor can be obtained from the slope of Z' vs. $\omega^{-1/2}$ plots (co is the angular frequency) in the Warburg region:

$$Z_{real} = \sigma\omega^{-1/2}$$

Based on the obtained slope, the $Li^+$ apparent diffusion coefficient for the LFP sample was calculated to be 1.05× $10^{-15}$ $cm^2$/s.

The apparent diffusion coefficient in solids at different temperatures can be predicted by the Arrhenius equation.

$$D_{Li^+}^{app} = D_0 e^{-E_a/kT}$$

where $D_{Li^+}^{app}$ is the lithium apparent diffusion coefficient, $E_a$ the activation energy (3.1 eV), k the Boltzmann constant (8.617×$10^{-5}$ eV/K), and Do the pre-exponential factor.

Figure 1E:
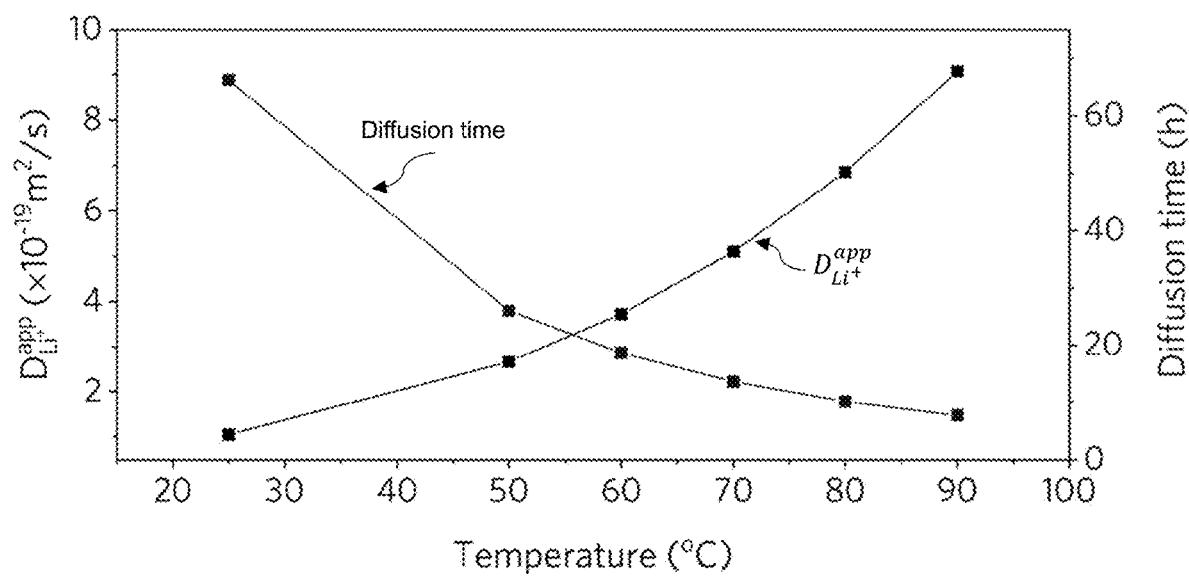

The relation between the mean diffusion time of $Li^+$ and the $D_{Li^+}^{app}$ diffusion coefficient can be estimated using the following the equation:

$$t = \frac{R^2}{4D_{Li^+}^{app}}$$

where t is the $Li^+$ diffusion time, $D_{Li^+}^{app}$ the diffusion coefficient at different temperature, and R the diffusion length (~100 nm). The calculated diffusion time as a function of temperature is plotted in FIG. 1E.

Electrochemical impedance spectroscopy (EIS) measurement showed a $Li^+$ apparent diffusion coefficient ($D_{Li^+}^{app}$) of 1.05×$10^{-15}$ $cm^2$/sec for $Li_{0.5}FePO_4$, which is consistent with previous reports. Assuming an average LFP particle size of 100 nm and using the above $D_{Li+}$, the calculated $Li^+$ diffusion time matches well with the relithiation time in the experiment, demonstrating the solution relithiation kinetics generally follows the semi-infinite solid-state diffusion mechanism. The effective relithiation at temperatures below the boiling point of water allows the process to be conducted at ambient pressure. This allows pressurized reactors to be replaced by low-cost vessels that do not require extra safety precautions, making the process even more practical for large scale operation.

To further validate the critical role of citric acid (CA), the same C-LFP was treated with a LiOH solution without CA. As expected, continuous oxidation of ($LiFePO_4$) to $Fe_2O_3$ and $Fe_3O_4$ was observed. This result also confirms the effectiveness of defect-targeted healing enabled by CA. In addition, CA is a widely used low-cost (~0.55 $/kg) additive in food industry, and it only generates $CO_2$, $H_2O$ and acetonedicarboxylic acid ($C_5H_6O_5$, ~10 $/kg) during the relithiation process. It should be also noted that $C_5H_6O_5$, an important intermediate for drug synthesis, is traditionally prepared by decarbonylation of CA in fuming sulfuric acid. This suggests that our direct LFP recycling process may be coupled with suitable precursors to offer an alternative route for green synthesis of valuable organic molecules. Other reducing agents such as ascorbic acid ("AA") (E=−0.55 V)[23] and tartaric acid ("TA") (E=−0.23 V) have demonstrated similar functionality to regenerate C-LFP, offering a variety of options for low-cost reducing agents.

X-ray diffraction (XRD) patterns of the C-LFP and samples after solution relithiation for different durations (denoted as "R-LFP") further illustrate the phase transition of degraded LFP during the solution relithiation process. For example, referring to FIG. 1D, the C-LFP shows intense peaks at 2θ=18° and 32° (highlighted by the dashed gray lines), which are attributed to the existence of the $FePO_4$ phase due to lithium loss. As the relithiation time increased from 1 hr to 5 hr at a temperature of the intensities of these peaks gradually diminished and then disappeared, suggesting the conversion of the $FePO_4$ phase to the LFP phase.

structural information listed in Table 2 below, where Phase 1 $LiFePO_4$: Space group: Pnma, $R_{wp}$=2.56%, a=10.2926(10) Å, b=5.9905(6) Å, c=4.6989(4) Å, α=β=γ=90°, Fraction: 52.9%, Phase 2 $FePO_4$: Space group: Pnma, $R_{wp}$=2.56%, a=9.8284(9) Å, b=5.7955(5) Å, c=4.7831(4) Å, α=β=γ=90°, Fraction: 47.1%.

TABLE 2

| Atom | Site | Wyckoff positions | | | Occupancy | Site | Wyckoff positions | | | Occupancy |
|---|---|---|---|---|---|---|---|---|---|---|
| | | 52.9% Phase 1 $LiFePO_4$ | | | | | 47.1% Phase21 $FePO_4$ | | | |
| Li | 4a | 0 | 0 | 0 | 0.952(17) | NA | | | | |
| Fe | 4a | 0 | 0 | 0 | 0.048(17) | 4a | 0 | 0 | 0 | 0.048(7) |
| Fe | 4c | 0.2831(4) | 0.25 | 0.9791(10) | 0.952(17) | 4c | 0.2741(4) | 0.25 | 0.9524(8) | 0.952(17) |
| Li | 4c | 0.2831(4) | 0.25 | 0.9791(10) | 0.048(17) | NA | | | | |
| P | 4c | 0.0985(7) | 0.25 | 0.4199(14) | 1 | 4c | 0.0909(7) | 0.25 | 0.4066(15) | 1 |
| O | 4c | 0.0952(7) | 0.25 | 0.7464(19) | 1 | 4c | 0.1186(6) | 0.25 | 0.7176(14) | 1 |
| O | 4c | 0.4570(7) | 0.25 | 0.1924(15) | 1 | 4c | 0.4435(7) | 0.25 | 0.1583(13) | 1 |
| O | 8d | 0.1685(5) | 0.0521(8) | 0.2809(11) | 1 | 8d | 0.1690(5) | 0.0467(3) | 0.2516(11) | 1 |

Figure 2C:
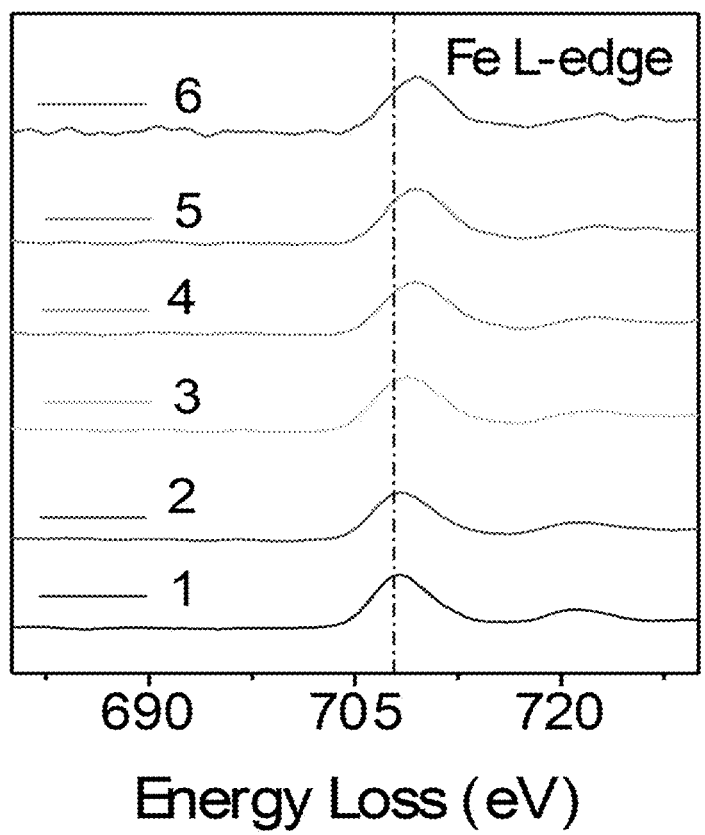

High-angle annular dark-field (HAADF) scanning transmission electron microscopic (STEM) images were obtained to further understand the relithiation mechanism at the atomic level. For LFP cathode after over 6500 cycles, the particles still show well-defined crystallinity with a conformal carbon coating (2-3 nm) retained on the surface (FIG. 2A). The electron energy loss spectroscopy (EELS) experiment was carried out to probe the valence states of O and Fe from the surface to the inner side of the particles (FIG. 2B). From one representative particle, the O K-edge and Fe L-edge spectra from the surface (point 1) to the inner side (point 6) of the C-LFP particle were compared. For the C-LFP, the O pre-peak gradually emerged from the surface to the bulk, suggesting the presence of the Fe' inside the C-LFP particle. The Fe L-edge gradually shifted from 707.93 eV to 709.65 eV, as shown in FIG. 2C and Table 1 below, suggesting the dominant presence of Fe' in the bulk. Point 1 indicates the surface of the particle and point 6 indicates the inner side of the particle.

TABLE 1

| C-LFP | | RS- LFP | |
|---|---|---|---|
| Fe L edge | Position (eV) | Fe L edge | Position (eV) |
| 1 (surface) | 707.93 | 1 (surface) | 707.75 |
| 2 | 708.27 | 2 | 707.23 |
| 3 | 708.71 | 3 | 707.48 |
| 4 | 709.26 | 4 | 707.61 |
| 5 | 709.46 | 5 | 707.72 |
| 6 (bulk) | 709.65 | 6 (bulk) | 707.81 |

In EELS spectra taken from another representative particle, a clear O K-edge pre-peak showed up in the spectrum obtained from the particle surface, indicating the presence of $Fe^{3+}$ on the surface. The above EELS results demonstrate the coexistence of $FePO_4$ and $LiFePO_4$ phases and their random distribution in different particles. Although several two-phase models have been proposed to understand the local structure of delithiated LFP, including the shrinking-core model, mosaic model, and domino-cascade model, they are mainly established upon the first charge and discharge cycle. Our results suggest a high inhomogeneity of phase distributions for the LFP particles after long-term charge/discharge cycles.

Figure 2G:
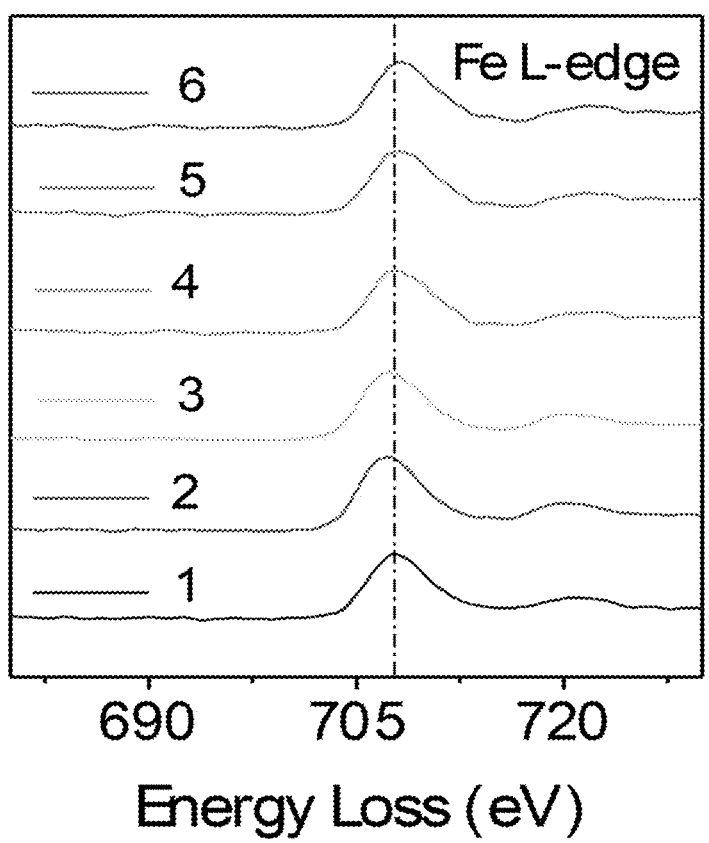
Figure 2D:
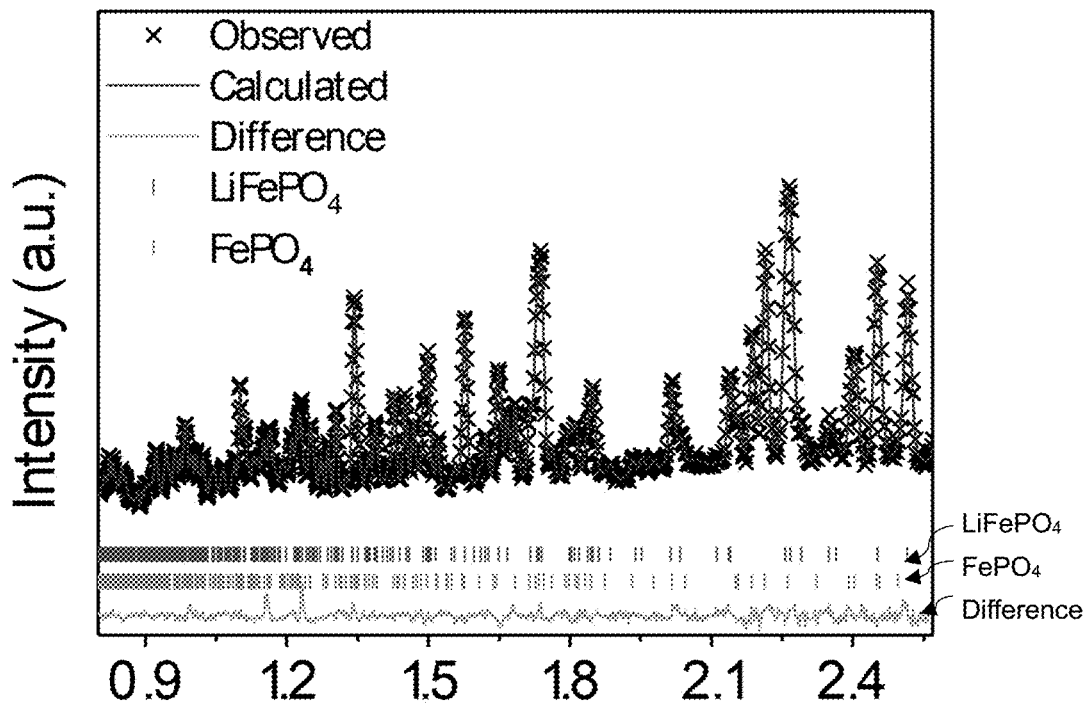

FIG. 2D shows the Rietveld refinement pattern of the neutron diffraction data of the C-LFP with the detailed Overall, the C-LFP exhibits 47.1% of Li deficiencies (loss) and 4.81% Fe/Li anti-site defects. The computational study by Malik et al. ("Particle size dependence of the ionic diffusivity", Nano Lett. (2010), 10, 4123-4127) showed that 0.1% anti-site can cause ~5% of $Li^+$ to be trapped in the defects in a 100 nm $LiFePO_4$ particle. Generally, Li inventory loss is considered to be the main reason for capacity degradation of LFP batteries while the impact of anti-site defects was often overlooked. Olivine LFP has Pnma space group with $Li^+$ confined in channels propped up by the interconnecting $FeO_6$ octahedra and $PO_4$ tetrahedra. Since the direction is the exclusive pathway for $Li^+$ diffusion, such a significant occupation of $Fe^{2+}$ in the Li sites can block $Li^+$ diffusion, which leads to loss of capacity and rate performance.

For the R-LFP sample, all the $Fe^{2+}$ around the $Li^+$ show ordered structure along the [010] direction, as revealed by the HAADF-STEM image of a representative R-LFP particle. (FIG. 2E). Continuous $Li^+$ diffusion channels along the direction is shown. The carbon shell was also retained after solution relithiation. The disappearance of the O pre-peak and the unchanged Fe L-edge at 707 eV (FIG. 2F) confirmed that the oxidation state of Fe from the surface to the bulk remained as 2+. The neutron diffraction data (FIG. 2G) further confirms that a pure orthorhombic LFP phase was obtained after the relithiation treatment, with the ratio of anti-site defects reduced to as low as 2.2%, which is even lower than the pristine LFP (denoted as "P-LFP") (2.5%).

Figure 2H:
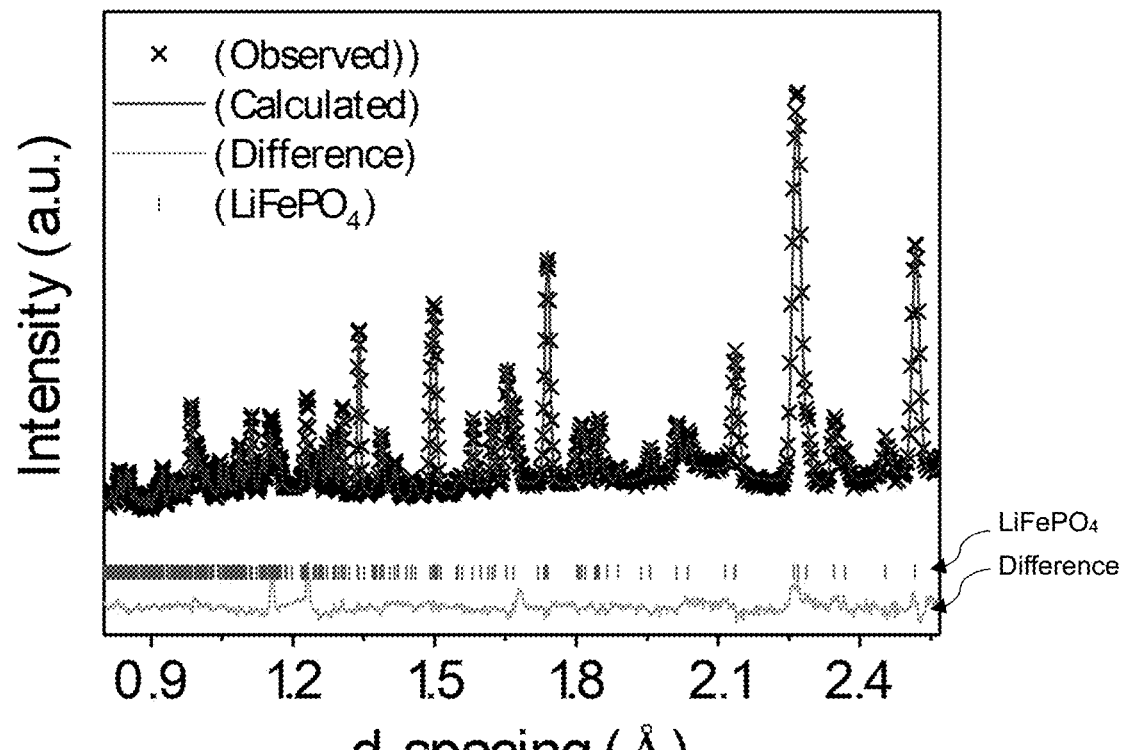

FIG. 2H provides the Rietveld refinement pattern of the neutron diffraction data of R-LFP. Table 3 below lists the structural parameters obtained from Rietveld refinement of neutron diffraction pattern of R-LFP, where $LiFePO_4$: Space group: Pnma, $R_{wp}$=4.09%, a=10.3146 (9) Å, b=6.0000 (6) Å, c=4.6909 (4) Å, α=β=γ=90°.

TABLE 3

| Atoms | Site | Wyckoff positions | | | Occupancy |
|---|---|---|---|---|---|
| Li | 4a | 0 | 0 | 0 | 0.978(7) |
| Fe | 4a | 0 | 0 | 0 | 0.022(7) |
| Fe | 4c | 0.2809(3) | 0.25 | 0.9741(9) | 0.978(7) |
| Li | 4c | 0.2809(3) | 0.25 | 0.9741(9) | 0.022(7) |
| P | 4c | 0.0965(6) | 0.25 | 0.4139(11) | 1 |
| O | 4c | 0.0960(7) | 0.25 | 0.7475(16) | 1 |
| O | 4c | 0.4556(5) | 0.25 | 0.1983(12) | 1 |
| O | 8d | 0.1636(4) | 0.0525(6) | 0.2774(7) | 1 |

High crystallinity LFP (denoted as "RS-LFP") with further reduced anti-site defects were obtained after a short sintering treatment of the R-LFP. The XRD patterns for each sample were examined to identify possible structural changes. While the average grain size grew from 72 to 96 nm as the sintering temperature increased from 400 to 800° C., no phase changes were observed. A uniform carbon coating also remained on the particle surface, as indicated by a homogenous distribution of C, P and Fe elements in element mapping, further suggesting targeted healing of the composition and microstructure defects in C-LFP.

Figure 3A:
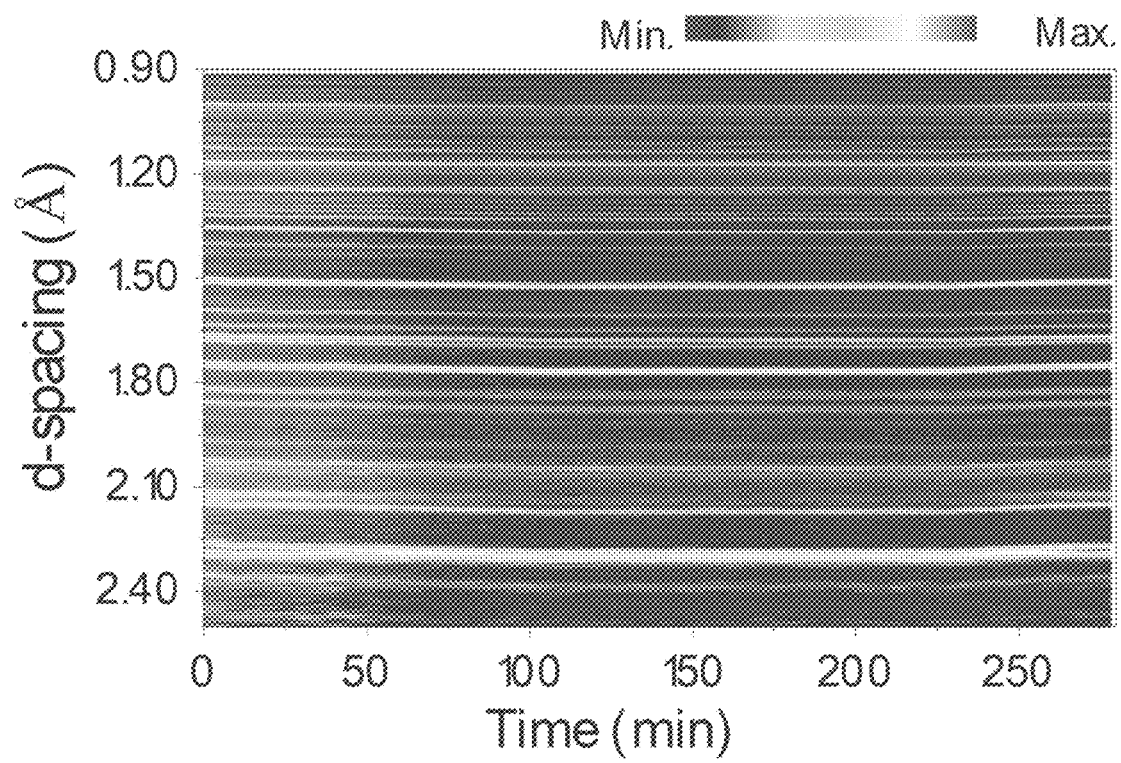
FIGS. 3A-3E illustrate various aspects of the electrochemical performance of LFP electrodes, where
Figure 3B:
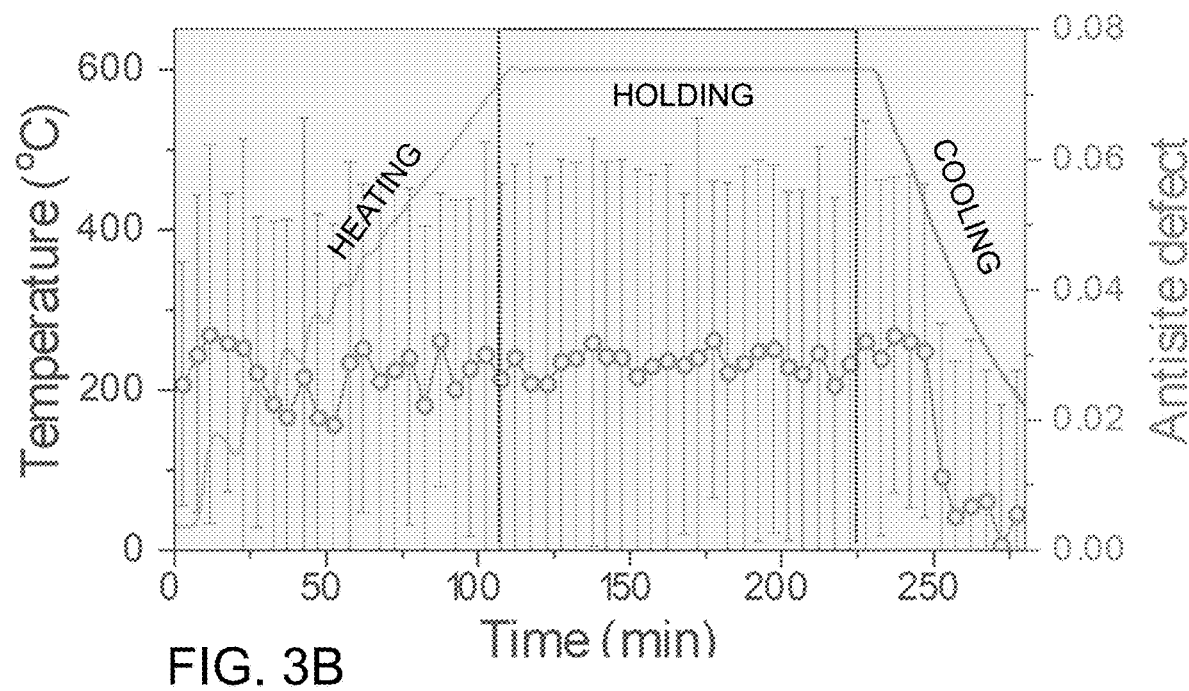

Operando neutron diffraction was performed to quantify the evolution of Feu anti-site defects during sintering. The time-dependent contour plot of peak intensity shown in FIG. 3A further confirms that pure LFP phase was maintained during heating and cooling, demonstrating good stability of the R-LFP particles. After cooling, the ratio of anti-site defects was reduced to 1.5%, which is further reduced compared with that of the P-LFP (2.5%). In FIG. 3B, the dots with error bars correspond to the ratio of the anti-site defects. By contrast, significant phase impurities (e.g., $Li_3PO_4$, $Fe_2P$) always exist after the solid-state reaction-based regeneration process (SS), where Li-containing precursor (e.g., $Li_2CO_3$, LiOH) was mixed with degraded LFP particles for sintering. It is an added benefit of the solution-based relithiation process to ensure homogenous Li distribution inside LFP particles, acting to eliminate phase impurities after sintering.

Figure 3C:
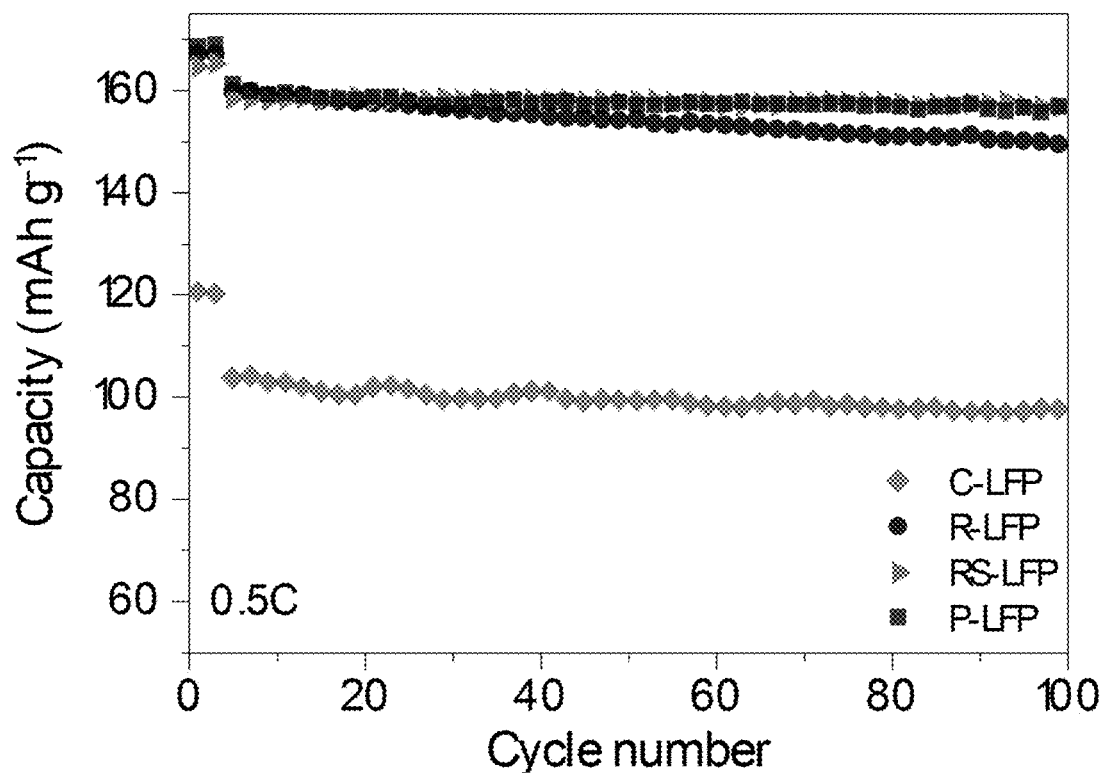

Electrochemical performance of the LFP samples was first evaluated using half cells. The cycling test started with 0.1C (1C=170 mA $g^{-1}$) activation for 2 cycles followed by 0.5C for another 100 cycles (FIG. 3C). The P-LFP showed a capacity of 161 mAh $g^{-1}$ at 0.5C with negligible capacity decay after 100 cycles. The capacity of the C-LFP recovered from spent cells was only 103 mAh $g^{-1}$ at 0.5C, which further decreased to 98 mAh $g^{-1}$ after 100 cycles. The initial capacity of the R-LFP was dramatically improved to 159 mAh $g^{-1}$, indicating the restored electrochemical activity after solution relithiation. However, only 93.7% of the initial capacity was maintained after 100 cycles. Such a degradation is probably associated with the $Li^+$/proton exchange during the aqueous relithiation, which has a negligible effect on the crystal structure, but induced side reactions due to presence of protons. The following short sintering step helps to create more stable particles that can deliver the same capacity and stability as the P-LFP. It was found that temperatures that were too low might aggravate structural defects, as has been reported in earlier studies of LFP synthesis, while temperatures that were too high could lead to larger grain size. Both cases led to inferior capacity of RS-LFP to P-LFP. When the sintering temperature increased from 400 to 600° C., the discharge capacity (at 0.5 C) of the first cycle increased from 148 to 159 mAh $g^{-1}$. When the temperature further increased from 600° C. to 800° C. the capacity dropped to 141 mAh $g^{-1}$. The capacity retention was 99%, 99%, 99%, 97% and 94% for the samples sintered at 400, 500, 600, 700 and 800° C., respectively.

Thermal sintering at 600° C. for 2 hours enables RS-LFP to deliver a capacity of 159 mAh $g^{-1}$ at 0.5 C with less than 1% of capacity loss after 100 cycles. With extended cycling at 0.5 C for 1000 cycles, the RS-LFP can still deliver a capacity of 150 mAh/g.

Figure 3D:
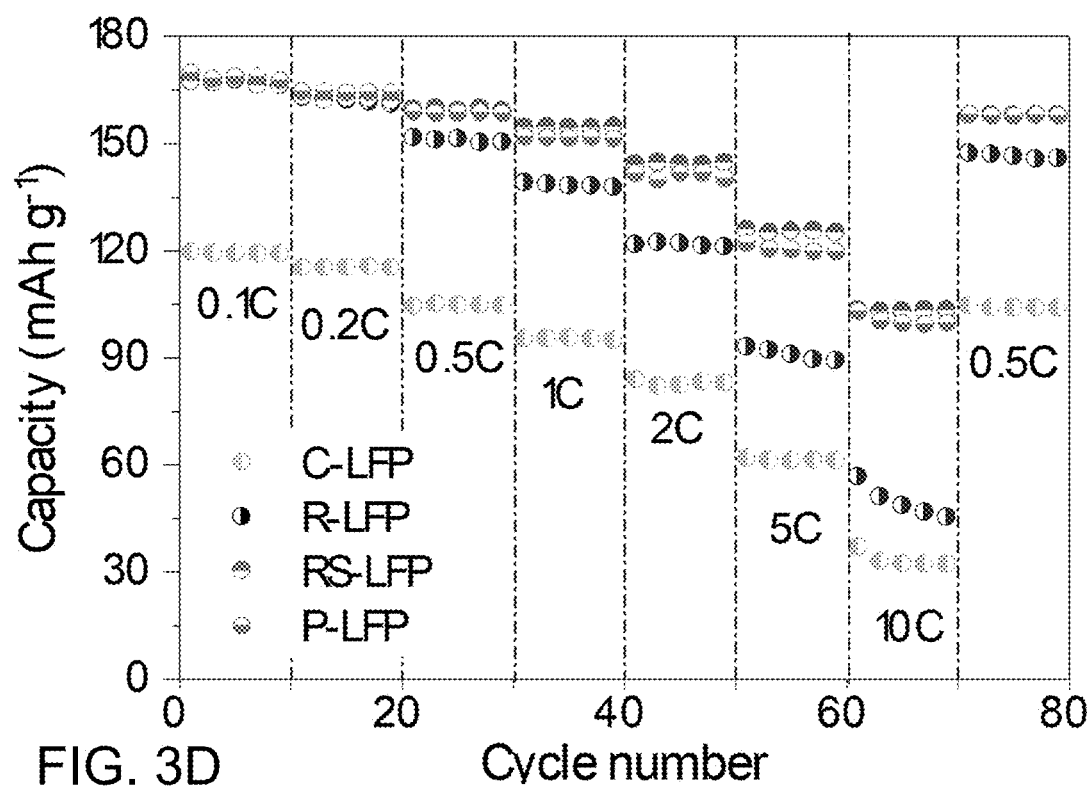
Figure 3E:
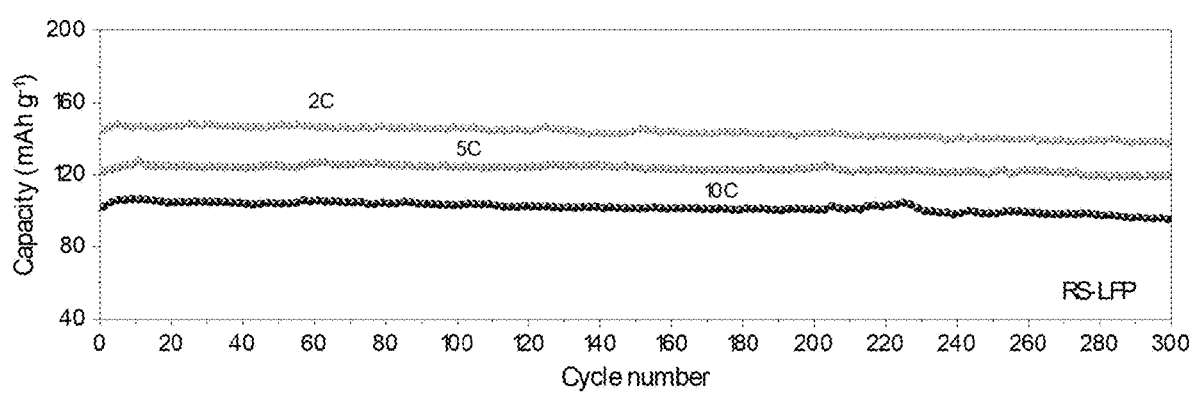

The rate capability of the C-LFP can be also recovered after the complete regeneration, as shown in FIG. 3D. Specifically, the P-LFP can deliver a capacity of 163, 141 and 99 mAh $g^{-1}$ at 0.2, 2 and 10 C, respectively. The capacity of RS-LFP increased to 162, 144 and 102 mAh $g^{-1}$, superior to that of P-LFP, especially at high rates. By contrast, the C-LFP can only provide a capacity of 115, 82 and 66 mAh $g^{-1}$, due to the Li loss and structure defects. In addition, the regenerated LFP also exhibited excellent long-term cycling stability. No obvious capacity loss was observed after 300 cycles at 2C, 5C and 10C rates (FIG. 3E). The significantly improved rate performance and high stability of the RS-LFP suggest that both the composition and structure of C-LFP have been completely recovered after the relithiation and short sintering treatment.

The high loading half-cell showed an initial capacity of 156 mAh/g and maintained at 157 mAh/g after 50 cycles at 0.5C. The pouch cell (3 cm×3 cm) can deliver a capacity of 28.6 mAh (3.17 mAh/cm 2) at a rate of 0.1C and without capacity degradation after cycling for 30 cycles. These results further suggest the significant potential of using directly regenerated LFP to manufacture new cells without sacrificing cell-level performance.

Figure 4A:
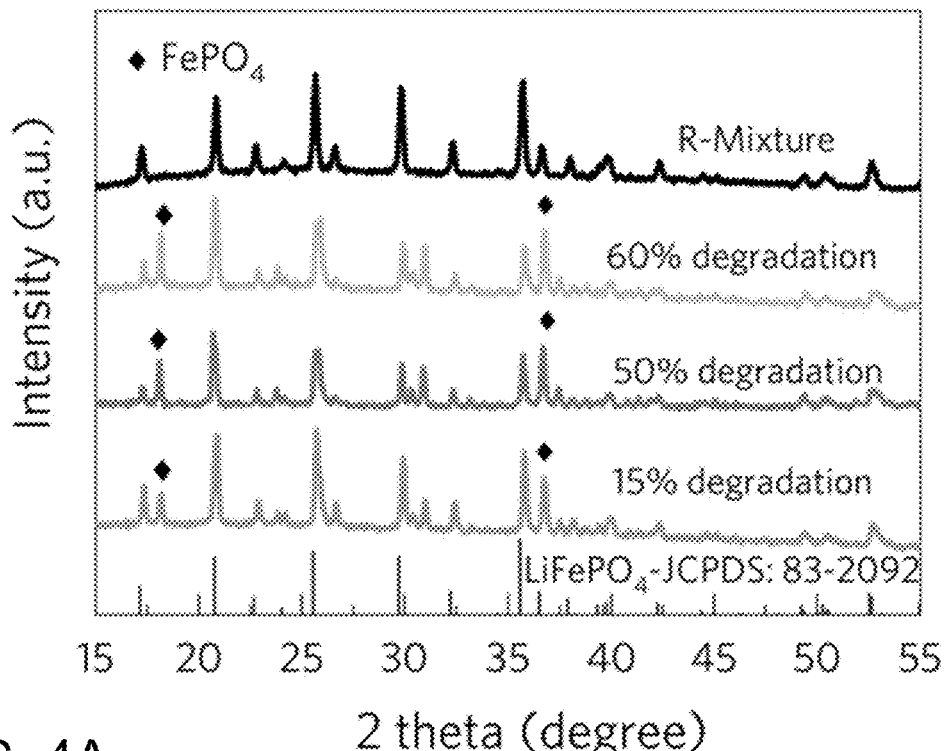
FIGS. 4A-4C provide XRD patterns and cycling stability, respectively, of RS-LFP regenerated from C-LFP with different SOHs. C-LFP with 15%, 50% and 60% degradation were regenerated using the same process. From XRD patterns in FIG. 4A, it can be seen that pure LFP phase was obtained after solution relithiation and sintering for all the samples. The capacity and stability of LFP with 15% and 60% degradation can be recovered to the same level as the P-LFP, as shown in FIGS. 4B and 4C. The process is schematically illustrated in FIG. 4D showing complete relithiation of C-LPF at different SOHs can be achieved from the same batch of reaction.
Figure 4B:
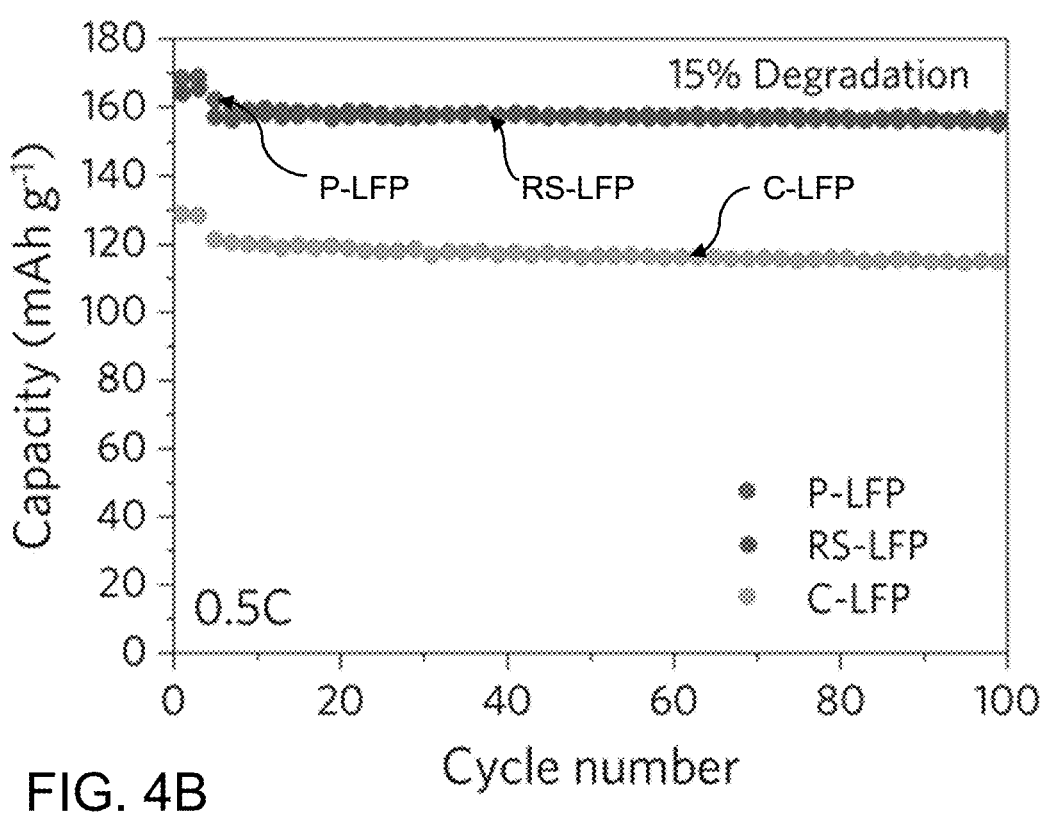
Figure 4C:
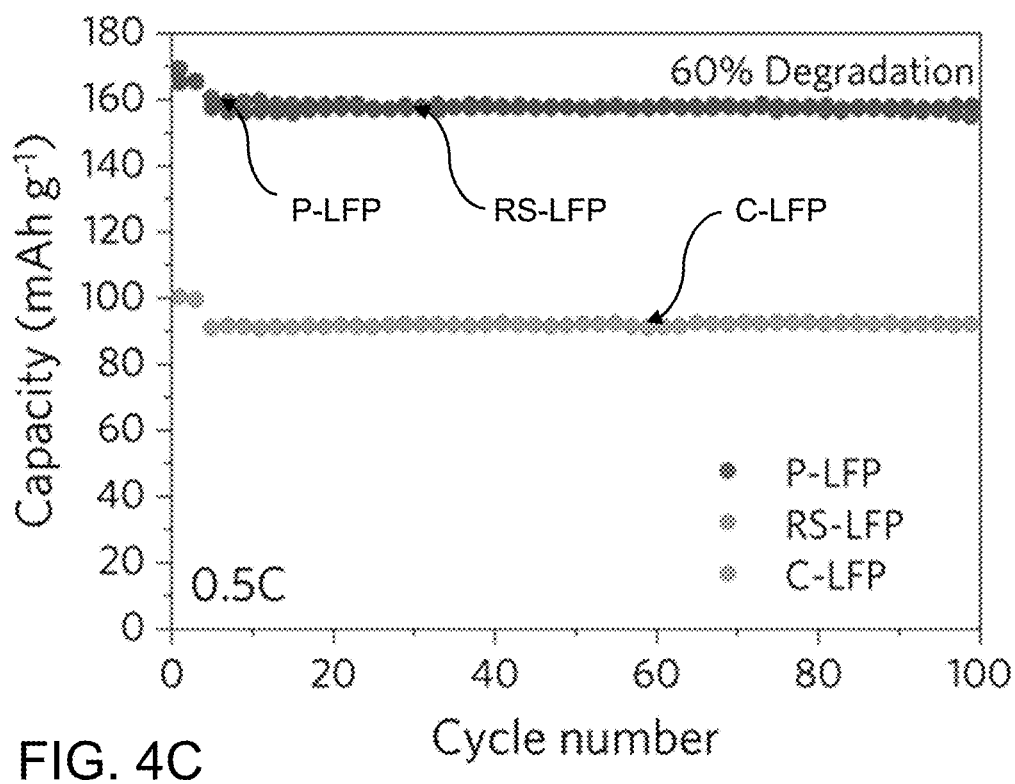
Figure 4D:
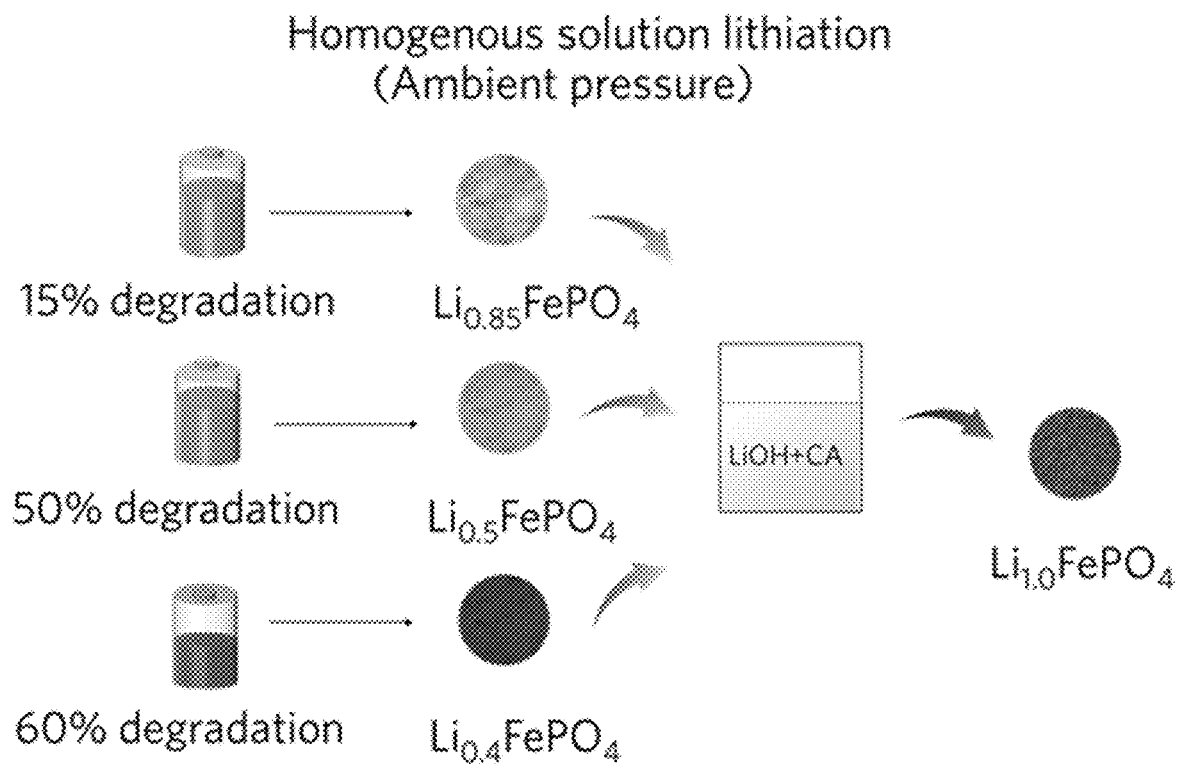

In general, 20% capacity loss is considered to be the end of life for electric vehicle (EV) batteries. By considering secondary use, one can assume that 50% capacity decay might be the lower limit of the service life of a LIB for any applications. In reality, a LIB waste stream might consist of cells with various degradation conditions. Therefore, we tested our method on a mixture of cycled cathode materials with states-of-health (SOH) of 40%, 50% and 85% to fully examine the effectiveness of our process. Subjected to the same regeneration process as described earlier, the cycled LFP mixture showed complete recovery of composition, structure, and electrochemical performance to the same level as P-LFP Using the same process, RS-LFP was regenerated from C-LFP with different SOHs: 15%, 50% and 60% degradation. From the XRD patterns in FIG. 4A, it can be seen that pure LFP phase was obtained after solution relithiation. FIGS. 4B-4C provide the capacity and stability of LFP with 60% degradation, showing recovery to the same level as the P-LFP. The process is schematically illustrated in FIG. 4D showing that complete relithiation of C-LPF at different SOHs can be achieved from the same batch of reaction.

These results suggest significant advantages of using the low-temperature solution relithiation method to treat spent batteries with a diverse range of health conditions, as the cathodes all reach a stoichiometric composition due to self-saturation.

In order to further examine the practical applications of the regenerated LFP (RS-LFP), commercial relevant thick electrodes with a mass loading of ~19 mg/cm² were prepared. These were then used to assemble both half cells (with Li metal as the counter electrode) and pouch cells (with graphite as the anode).

The corresponding electrochemical performance was evaluated by constructing a cathode casting with a commercial relevant ratio (RS-LFP:Super P:PVDF=95:2:3) and the mass loading of active material was ~19 mg/cm². The electrolyte was LP40 (1M $LiPF_6$ in EC/DEC) and the cells were cycled with activation for 3 cycles at 0.1C and followed by extended cycling at 0.5C.

Figure 5A:
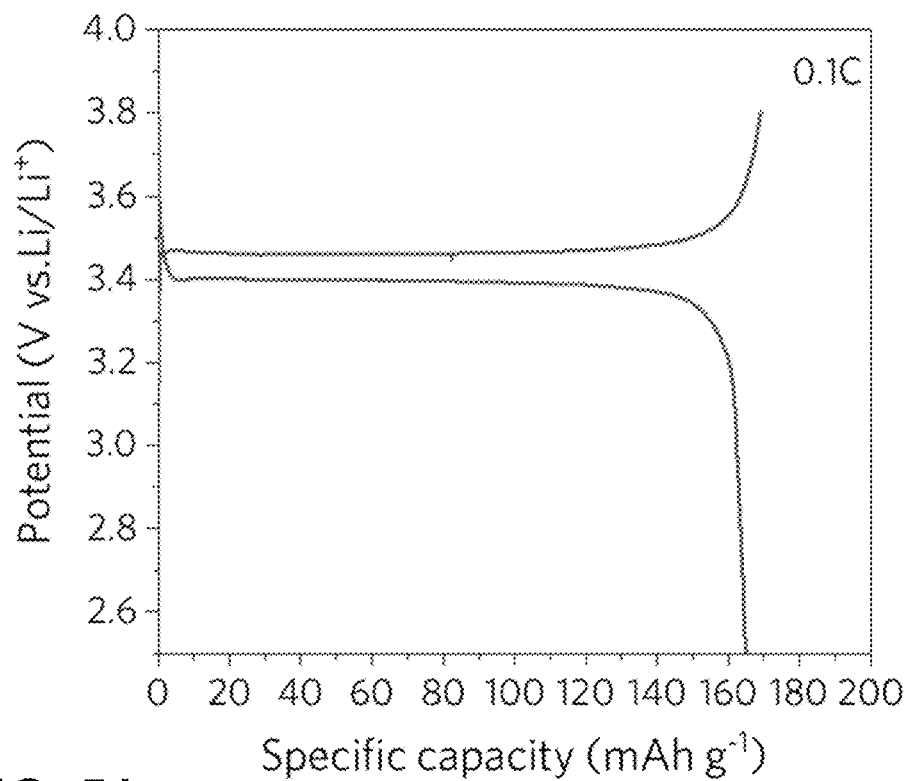
FIGS. 5A-5D provide the results of electrochemical performance where FIG. 5A plots the results of the charging and discharging process in the first cycle at a rate of 0.1C.
Figure 5B:
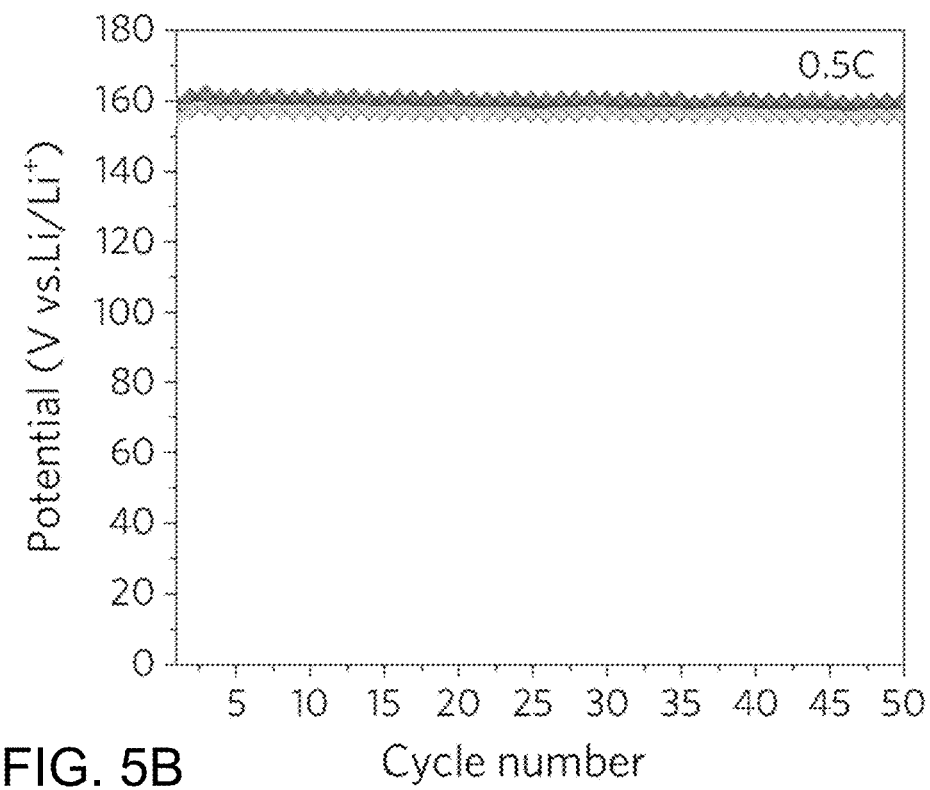
Figure 5C:
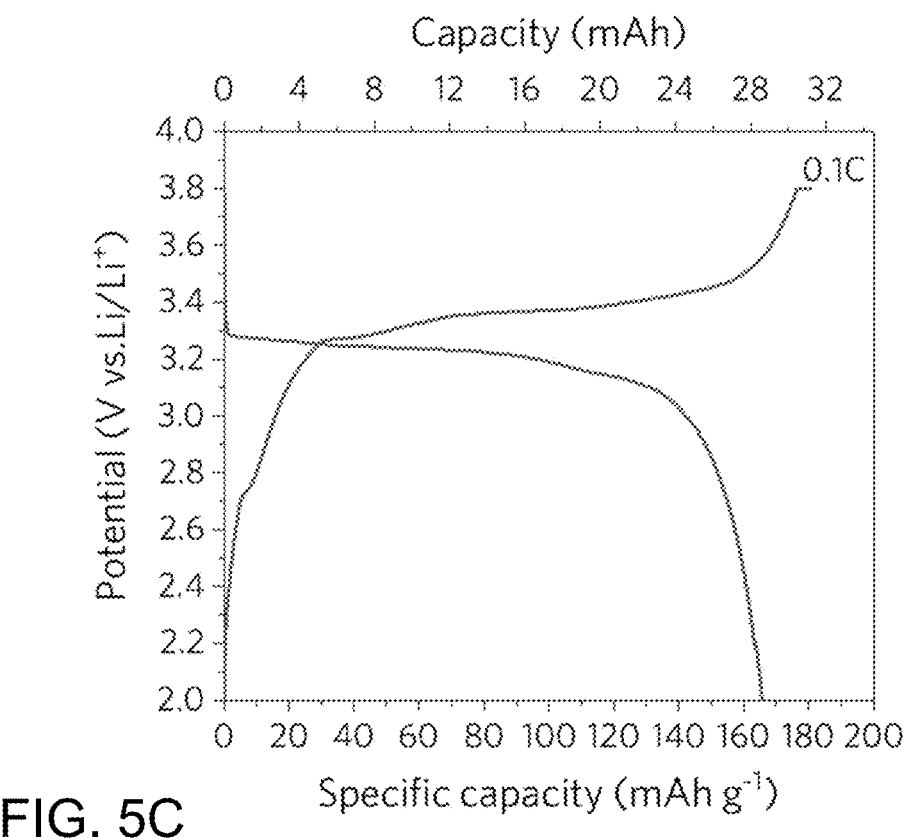
Figure 5D:
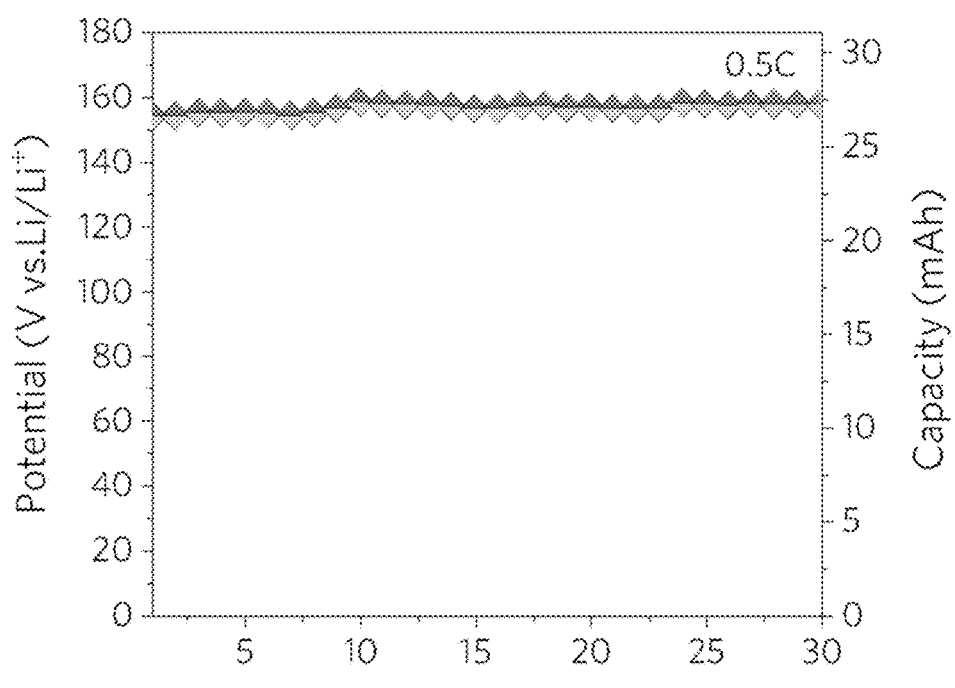

FIG. 5A plots the results of the charging and discharging process in the first cycle at a rate of 0.1C, yielding a reasonable first cycle Columbic Efficiency (97.6%) with a capacity of 166 mAh/g. The half-cell delivers capacities of 169 and 165 mAh/g. The cycling stability was next evaluated at a rate of 0.5C, with the results plotted in FIG. 5B. For such a high mass loading cathode, the RS-LFP delivered a capacity of 156 mAh/g initially and maintained a capacity of 157 mAh/g after 50 cycles, suggesting good stability. FIG. 5C shows that the discharge capacity of the full-cell at the first cycle of is 166 mAh/g, almost achieving the theoretical capacity (172 mAh/g) of LFP. It should be noted that the assembled pouch cell can reach a total capacity of 28.6 mAh (3.17 mAh/cm 2). FIG. 5D plots the cycling stability at a rate of 0.5C. Notably, these results are comparable to several of the leading commercial LFP suppliers around the world: A123 Systems, LLC (154 mAh/g), Phostech Lithium Inc. (156 mAh/g), Likai (158 mAh/g), Valence Technology, Inc. (149 mAh/g), and Sitelan (156 mAh/g). The capacity can still retain 157 mAh/g after 30 cycles. These results further confirm that the regenerated LFP exhibited excellent electrochemical performance even in commercially-relevant thick electrodes, showing great potential for practical application.

Figure 6A:
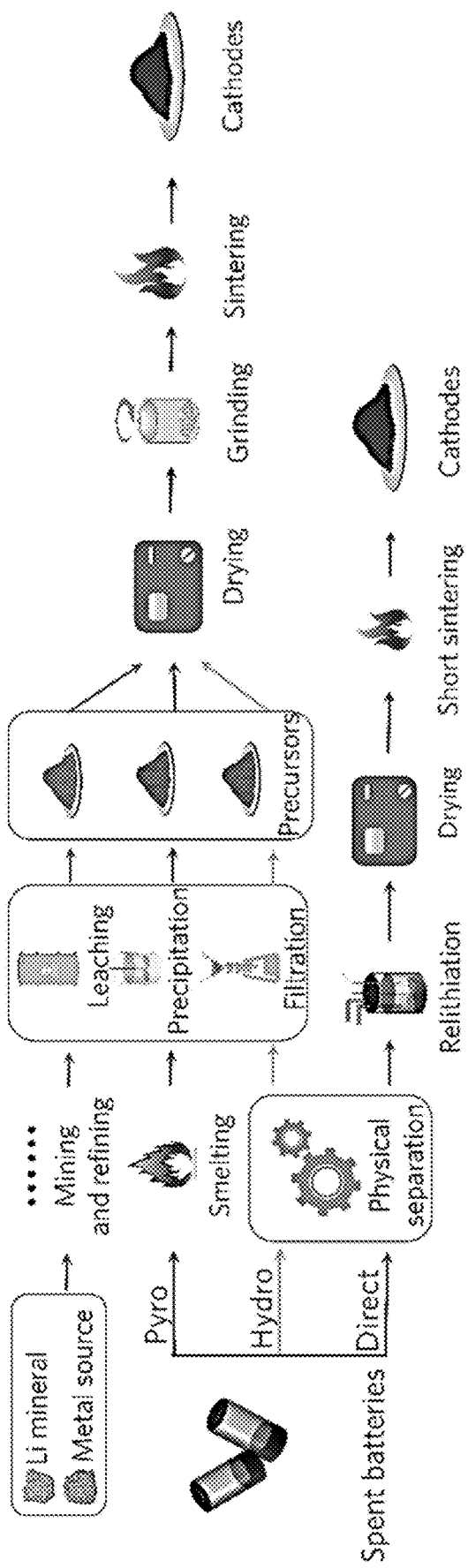
FIGS. 6A-6E illustrate economic and environment analyses comparing the inventive approach with other recycling methods, where FIG. 6A provides simplified schematics of pyrometallurgical ("Pyro") and hydrometallurgical ("Hydro") and direct recycling ("Direct") methods, as well as cathode production from virgin materials mining.

FIG. 6A provides a brief flowchart of cathode regeneration from direct recycling of cathodes from spent LIB materials, as well as pyrometallurgical recycling ("Pyro"), hydrometallurgical recycling ("Hydro"), and virgin cathode material production. It should be noted that currently, pyrometallurgical and hydrometallurgical recycling routes are not used commercially to recover cathode material from spent LFP batteries due to economic loss. They are included here as potential end-of-life management options for LFP batteries, on the assumption that battery recycling will be mandated before new recycling technologies become available. Compared with other processes, the clear advantages of developing the direct recycling process for LFP lie in: 1) simplified operation facilities and processes, 2) reduced operation temperature and time, and 3) eliminating the usage of strong acid and base. These features are associated with the potential economic and environmental benefits that can be analyzed by the EverBatt model developed by Argonne National.

Figure 6B:
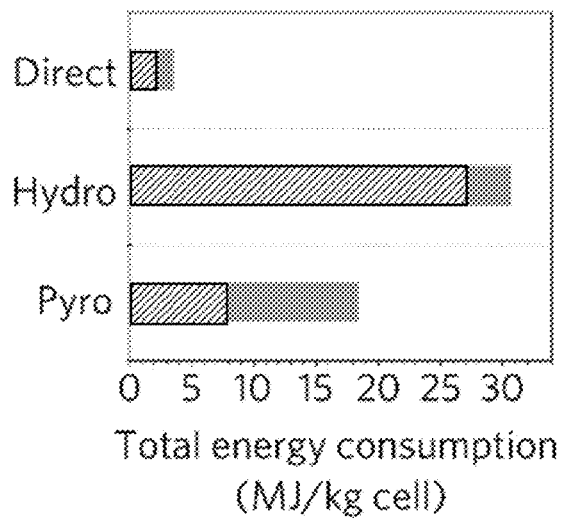
Figure 6C:
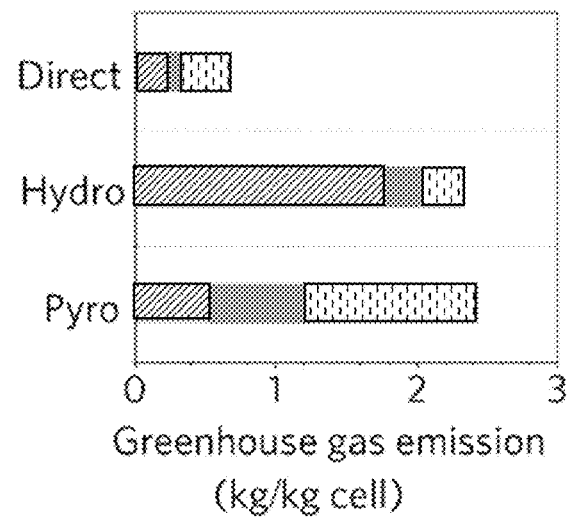
Figure 6D:
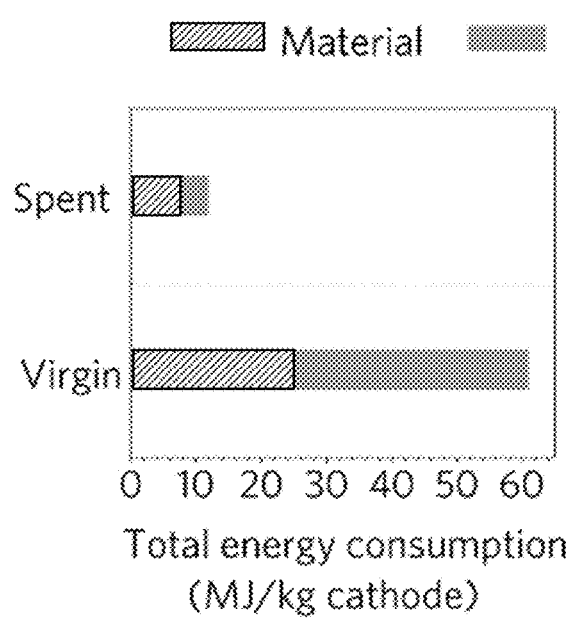
Figure 6E:
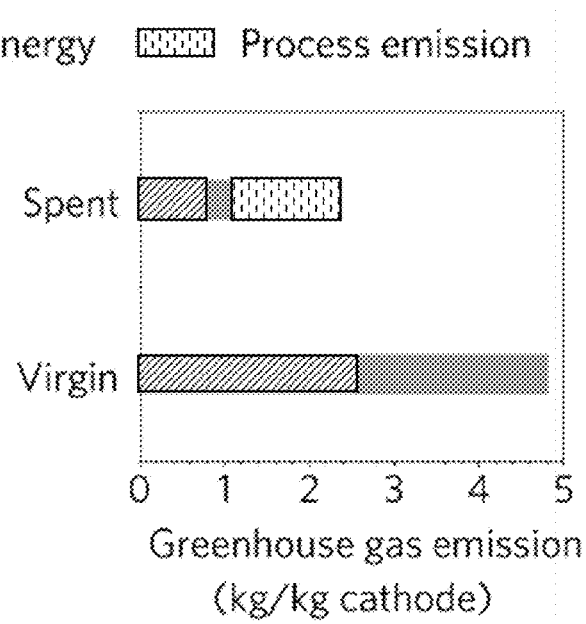

The three different recycling methods are modeled assuming 10,000 tons of spent batteries annual plant processing capacity (FIG. 6B). The life-cycle total energy use for pyrometallurgical and hydrometallurgical processes are 18.4 and 30.6 MJ LFP cell, respectively. In the pyrometallurgical process, 55% of the energy use is attributed to high temperature smelting. In the hydrometallurgical process, 87.8% of the energy use comes from upstream production of the chemicals consumed in the process. The total energy use for direct recycling is only 3.5 MJ LFP cell, significantly lower than the other processes. GHG emissions are also an important factor to consider when evaluating a recycling approach. As shown in FIG. 6C, the total GHG emissions released from the direct recycling process are only 26.6% and 27.7% of those from pyrometallurgical and hydrometallurgical processes, respectively. Moreover, the total energy use per kg of cathode made from direct recycling of the spent batteries is only 22.3% of that for cathode produced from virgin materials (FIG. 6D). The GHG emissions from cathode production via direct regeneration of spent batteries is 46.2% lower than that from virgin materials (FIG. 6E).

The total cost of pyrometallurgical, hydrometallurgical, and direct recycling is $3.4, $2.4 and $2.1 per kg of spent battery cells processed, respectively. It should be noted that any recycled Al, Cu, graphite is assumed sold to recover some cost, but the net revenue cannot cover the high cost of the pyrometallurgical and hydrometallurgical recycling processes due to the use of expensive equipment, significant quantities of materials, and high energy consumption. This is the main reason why the industry currently does not cycle LFP cells. In contrast, using direct recycling as described herein, the regenerated cathode materials can be used by cell manufacturers without further re-synthesis, resulting in a potential profit of 1.04 $ per kg of recycled spent batteries.

The significant reductions in total energy use, GHG emissions, and lower cost afforded by the inventive the low-temperature aqueous relithiation-based direct regeneration method provide an important option for spent LIB recycling. Existing methods for LFP recycling continue to be based on hydrometallurgical processes or other destructive processes. Ideally, solid-state sintering by adding a desired amount of lithium back into spent LFP cathode powders may also restore their original composition. However, it may be practically challenging to determine an accurate quantity of lithium dosage for a large number of spent cells having significantly different SOHs. More importantly, defect-targeted healing cannot be achieved as manifested by the relatively low capacity of recycled LFP from solid-state sintering. While chemical lithiation in an aprotic solvent (e.g., acetonitrile) using strong reducing agent may also be used to re-functionalize spent LFP, the highly caustic nature of such system may restrict its practical application.

Figure 7A:
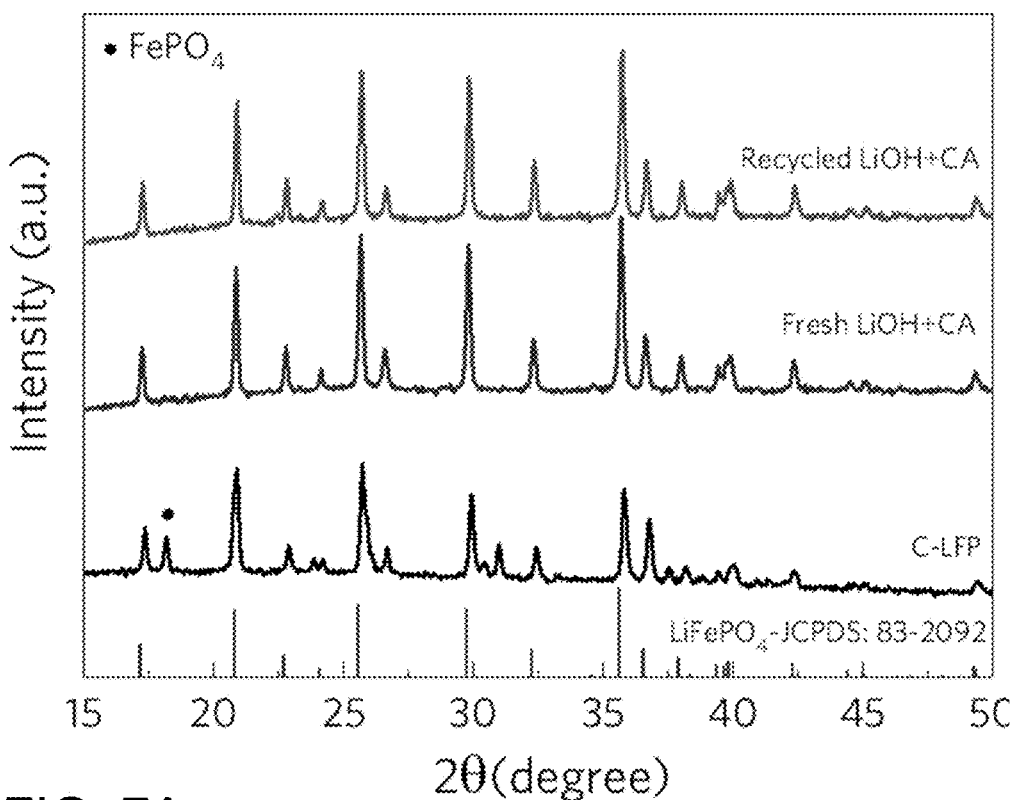
FIGS. 7A and 7B are XRD patterns and cycling performance, respectively, of the C-LFP and RS-LFP regenerated with a fresh and recycled relithiation solution of LiOH and CA.
Figure 7B:
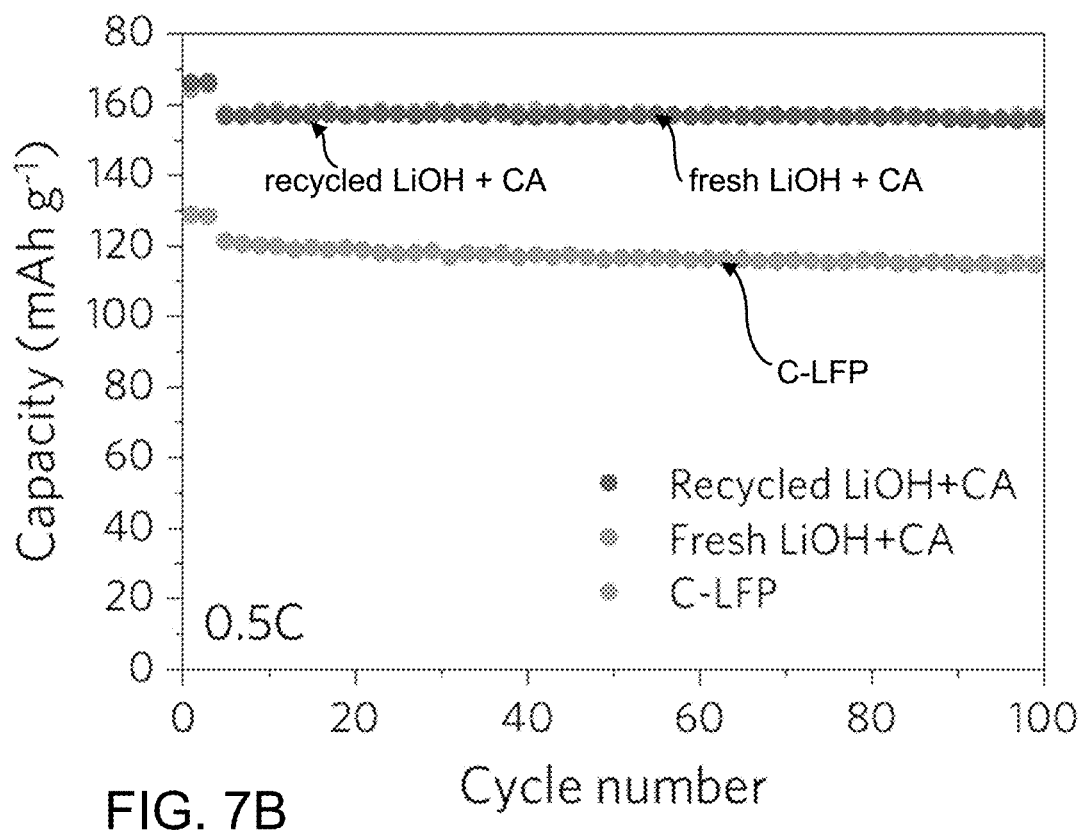

Another advantage of using the inventive ambient condition solution process is that the relithiation solution itself can be also recycled. For example, the used solution with LiOH and CA was tested to relithiate a second batch of spent LFP under the same conditions. The XRD patterns and cycling stability of RS-LFP regenerated with a fresh and recycled solution are compared in FIGS. 7A and 7B. As seen in in FIG. 7B, the fresh and recycled lines completely overlap. Thus, a pure LFP phase can be obtained even using the recycled solution of LiOH and CA. The capacity and stability of RS-LFP reached the same level as that regenerated with a fresh solution of LiOH and CA. The successful demonstration of recycling and reuse of the relithiation solution of LiOH and CA adds further efficiencies to reduce the overall operational costs of the inventive direct recycling method.

The methods and procedures described herein demonstrate a defect-targeted healing method for more efficient and sustainable recycling of spent LIB materials. These improvements represent a paradigm-shift towards potentially profitable and green recycling of LIBs that are simply not possible with existing recycling processes. The complete recovery of the electrochemical performance of spent LFP cathode to the level of pristine material can improve the market acceptance of recycled battery materials. Moreover, under the Everbatt model, assuming 10,000 tons of annual plant processing capacity of spent batteries suggests that our direct regeneration route has low energy consumption of 3.5 MJ LFP cell (accounting for only 19% and 11% of pyro- and hydrometallurgical processes, respectively) and low GHG emissions of 0.7 kg/kg LFP cell (26.6% and 27.7% of pyro- and hydrometallurgical processes, respectively). Importantly, the cost of direct regeneration can be reduced to $2.1 per kg spent LFP cell, compared with $3.4 and $2.4 for pyro- and hydrometallurgical processes, respectively. It should be noted that even though remain some uncertainties in terms of the costs of battery collection and transportation, they can be expected to be the same regardless of which recycling process is used since they will presumably be collected from the same source. Thus, the efficiencies obtained through direct recycling are attributable to the significantly improved operation design and reduced chemical usage.

The invention claimed is:

1. A method for regeneration of spent cathode material of lithium-ion batteries, the method comprising:
lithiating the cathode material in an aqueous relithiation solution comprising at least one reducing agent heated to a temperature in the range of 60° C. to 180° C. to heal composition defects in the cathode material and produce a healed lithiated cathode material, wherein the at least one reducing agent is an organic reducing agent selected from the group consisting of citric acid, ascorbic acid, tartaric acid, oxalic acid, sugars, or a combination thereof; and sintering the healed lithiated cathode material.

2. The method of claim 1, wherein the relithiation solution comprises a lithium salt.

3. The method of claim 1, wherein the organic reducing agent comprises citric acid and the relithiation solution comprises 0.01M-4M LiOH and 0.01M-2M citric acid.

4. The method of claim 2, wherein the lithium salt is selected from the group consisting of $Li_2CO_3$, LiOH, $Li_2SO_4$, LiCl, $LiC_2H_3O_2$, and $LiNO_3$.

5. The method of claim 1, wherein the healed lithiated cathode material is $LiFePO_4$.

6. The method of claim 1, wherein the spent cathode material is processed prior to lithiating by:
 disassembling the lithium-ion battery and removing cathode strips;
 disposing the cathode strips in a solvent to separate lithium-containing powder from other components within the cathode strips; and
 washing and drying the separated lithium-containing powder.

7. The method of claim 1, wherein lithiating the cathode material in the aqueous relithiation solution is performed for at least 1 hour.

8. The method of claim 1, wherein the temperature is in the range of 60° C.-120° C.

9. The method of claim 1, wherein sintering is performed in a furnace under an inert atmosphere at a sintering temperature in the range of 400° C. to 800° C. for a sintering time in a range of 50 minutes to 300 minutes.

10. The method of claim 9, wherein the sintering time comprises temperature ramping to gradually heat the healed lithiated cathode material at a controlled rate.

11. The method of claim 1, wherein the aqueous relithiation solution is recyclable and reusable for subsequent relithiation processes.

12. A method for regeneration of $LiFePO_4$ cathode material from spent lithium-ion batteries, the method comprising:
 disassembling the lithium-ion battery and removing cathode strips;
 soaking the cathode strips in a solvent to separate lithium-containing powder from other components within the cathode strips; and
 washing and drying the separated lithium-containing powder;
 disposing the lithium-containing powder in a vessel with an aqueous relithiation solution comprising at least one reducing agent, wherein the at least one reducing agent is an organic reducing agent is selected from the group consisting of citric acid, ascorbic acid, tartaric acid, oxalic acid, sugars, or a combination thereof;
 heating the vessel and aqueous relithiation solution to a temperature in the range of 60° C. to 180° C. to heal composition defects in the cathode material and produce a healed lithiated cathode material; and
 sintering the healed lithiated cathode material in an inert atmosphere at a sintering temperature.

13. The method of claim 12, wherein the aqueous relithiation solution comprises a lithium salt.

14. The method of claim 12, wherein the organic reducing agent comprises citric acid and the aqueous relithiation solution comprises 0.01M-4M LiOH and 0.01M-2M citric acid.

15. The method of claim 13, wherein the lithium salt is selected from the group consisting of $Li_2CO_3$, LiOH, $Li_2SO_4$, LiCl, $LiC_2H_3O_2$, and $LiNO_3$.

16. The method of claim 12, wherein heating is performed for at least 1 hour.

17. The method of claim 12, wherein the temperature is 60° C. to 120° C. and heating is performed for at least 5 hours.

18. The method of claim 12, wherein the sintering temperature is in the range of 400° C. to 800° C. and sintering is performed for a sintering time in a range of 50 minutes to 300 minutes.

19. The method of claim 18, wherein the sintering time comprises temperature ramping to gradually heat the healed lithiated cathode material at a controlled rate.

20. The method of claim 12, wherein the aqueous relithiation solution is recyclable and reusable for subsequent relithiation processes.

* * * * *